US009015099B2

(12) United States Patent
Nitz et al.

(10) Patent No.: US 9,015,099 B2
(45) Date of Patent: Apr. 21, 2015

(54) METHOD, SYSTEM AND DEVICE FOR INFERRING A MOBILE USER'S CURRENT CONTEXT AND PROACTIVELY PROVIDING ASSISTANCE

(75) Inventors: Kenneth C. Nitz, Redwood City, CA (US); Patrick D. Lincoln, Woodside, CA (US); Karen L. Myers, Menlo Park, CA (US); Hung H. Bui, Mountain View, CA (US); Rukman Senanayake, San Jose, CA (US); Grit Denker, Palo Alto, CA (US); William S. Mark, San Mateo, CA (US); Norman D. Winarsky, Palo Alto, CA (US); Steven S. Weiner, Merion Station, PA (US)

(73) Assignee: SRI International, Menlo Park, CA (US)

( * ) Notice: Subject to any disclaimer, the term of this patent is extended or adjusted under 35 U.S.C. 154(b) by 263 days.

(21) Appl. No.: 13/585,008

(22) Filed: Aug. 14, 2012

(65) Prior Publication Data
US 2014/0052681 A1 Feb. 20, 2014

(51) Int. Cl.
G06N 5/02 (2006.01)
G06N 5/04 (2006.01)
H04L 12/58 (2006.01)

(52) U.S. Cl.
CPC ............... *G06N 5/046* (2013.01); *H04L 51/02* (2013.01)

(58) Field of Classification Search
None
See application file for complete search history.

(56) References Cited

U.S. PATENT DOCUMENTS

| 6,037,976 | A | 3/2000 | Wixson |
| 6,262,730 | B1 * | 7/2001 | Horvitz et al. ............... 715/707 |
| 6,745,021 | B1 | 6/2004 | Stevens |
| 6,859,931 | B1 | 2/2005 | Cheyer et al. |
| 7,069,560 | B1 | 6/2006 | Cheyer et al. |
| 7,171,046 | B2 | 1/2007 | Myers et al. |
| 7,639,840 | B2 | 12/2009 | Hanna et al. |
| 7,835,578 | B2 | 11/2010 | Cheng et al. |
| 2006/0266830 | A1 | 11/2006 | Horozov et al. |
| 2008/0155080 | A1 | 6/2008 | Marlow et al. |
| 2009/0215479 | A1 | 8/2009 | Karmarkar |
| 2009/0224867 | A1 | 9/2009 | O'Shaughnessy et al. |
| 2009/0298511 | A1 | 12/2009 | Paulson |
| 2009/0307162 | A1 | 12/2009 | Bui et al. |
| 2011/0028138 | A1 | 2/2011 | Davies-Moore et al. |
| 2011/0145051 | A1 | 6/2011 | Paradise et al. |
| 2011/0276565 | A1 | 11/2011 | Zheng et al. |
| 2012/0131020 | A1 | 5/2012 | Nitz et al. |

FOREIGN PATENT DOCUMENTS

WO 2011161674 A1 12/2011

OTHER PUBLICATIONS

Horvitz, et al., (U.S. Patent No. 6,262,730 B1; dated Jul. 17, 2001; class 345; subclass 337) discloses an "intelligent user assistance facility."*

(Continued)

*Primary Examiner* — Wilbert L Starks
(74) *Attorney, Agent, or Firm* — Barnes & Thornburg LLP

(57) ABSTRACT

A device, method and system for automatically inferring a mobile user's current context includes applying a user activity knowledge base to real-time inputs and stored user-specific information to determine a current situation. Automated reasoning is used to infer a user-specific context of the current situation. Automated candidate actions may be generated and performed in accordance with the current situation and user-specific context.

21 Claims, 7 Drawing Sheets

(56) References Cited

OTHER PUBLICATIONS

Bourke, A.K. et al., "A Threshold-Based Fall-Detection Algorithm Using a Bi-Axial Gyroscope Sensor," ScienceDirect, Medical Engineering & Physics 30, Jan. 2008, pp. 84-90 (7 pages).

Bourke, A.K. et al., "Evaluation of a Threshold-Based Tri-Axial Accelerometer Fall Detection Algorithm," ScienceDirect, Gait & Posture 26, Jul. 2007, pp. 194-199 (6 pages).

Reyna, Rogelio et al., "Human Fall Detection Using 3-Axis Accelerometer," Freescale Semiconductor Reference Manual, rev. 2.0, Dec. 2005, pp. 1-42 (42 pages).

Chen, Jay et al., "Wearable Sensors for Reliable Fall Detection," Proceedings of the 2005 IEEE Engineering in Medicine and Biology, Shanghai, China, Sep. 2005, pp. 3551-3554 (4 pages).

Nguyen, Nam T. et al., Learning and Detecting Activities from Movement Trajectories Using the Hierarchical Hidden Markov Model, 6 pages.

Bui, Hung H. et al., The Hidden Permutation Model and Location-Based Activity Recognition, 6 pages.

Duong, T. et al., Efficient duration and hierarchical modeling for human activity recognition, Artificial Intelligence, vol. 173, pp. 830-856, May 2009, 27 pages.

Yorke-Smith, Neil et al., The Design of a Proactive Personal Agent for Task Management, Sep. 15, 2011, 30 pages.

Cohn, Gabe et al., Humantenna: Using the Body as an Antenna for Real-Time Whole-Body Interaction, CHI'12, May 5-10, 2012, 10 pages, Austin, Texas, USA.

U.S. Appl. No. 13/534,155 to Senanayake et al., filed Jun. 27, 2012, 75 pages.

U.S. Appl. No. 13/484,520 to Sawhney et al., filed May 31, 2012, 44 pages.

U.S. Appl. No. 13/287,985 to Donneau-Golencer et al., filed Nov. 2, 2011, 24 pages.

U.S. Appl. No. 13/158,109 to Senanayake et al., filed Jun. 10, 2011, 53 pages.

U.S. Appl. No. 13/399,210 to Senanayake et al., filed Feb. 17, 2012, 40 pages.

Bauldauf et al., "A survey on context-aware systems," International Journal of Ad Hoc and Ubiquitous Computing, vol. 2, No. 4, 2007, 15 pages.

Zheng et al., "Collaborative Location and Activity Recommendations with GPS History Data," Proceedings of the 19th international conference on World Wide Web, ACM, 2010, 10 pages.

Van Setten et al., "Context-Aware Recommendations in the Mobile Tourist Application COMPASS," Springer-Verlag Berlin Heidelberg, 2004, 10 pages.

Takeuchi et al., "CityVoyager: An Outdoor Recommendation System Based on User Location History," Ubiquitous Intelligence and Computing, Springer-Verlag Berlin Heidelberg, 2006, 12 pages.

Siewiorek et al., "SenSay: A Context-Aware Mobile Phone," 2012 16th International Symposium on Wearable Computers, IEEE Computer Society, 2003, 2 pages.

Feng et al., "Modelling situation awareness for Context-aware Decision Support," Expert Systems with Applications vol. 36, 2009, 9 pages.

Notice of Non-Final Rejection for U.S. Appl. No. 13/585,003, Aug. 4, 2014, 28 pages.

\* cited by examiner

METHOD, SYSTEM AND DEVICE FOR INFERRING A MOBILE USER'S CURRENT CONTEXT AND PROACTIVELY PROVIDING ASSISTANCE

BACKGROUND

Mobile device users often exist in an online or "virtual" world, in which they interact with others, consume information, and conduct business electronically, while operating in the physical world at the same time. Mobile devices are increasingly equipped with sensors and other hardware that can provide information about the user's geographic location. For example, mobile location-based services can be used to generate maps, driving directions, and lists of nearby venues, or to inform other people of the user's current location. However, existing systems generally require the user to take some overt action (such as pressing a button or saying a command) to initiate the use of location-based services, to request information, or to use other services that are available with the mobile device. Particularly when people are busy doing other things, they may not recognize the need for, or remember to request, information or services that could be important or useful to them in the current moment.

SUMMARY

According to at least one aspect of this disclosure, a method for automatically inferring a user-specific current context with a mobile electronic device includes monitoring one or more real-time sensor inputs at the mobile electronic device; applying an activity knowledge base to determine a current location-related situation from the one or more real-time sensor inputs and stored user-specific information; and using automated reasoning, inferring a user-specific context relating to the current location-related situation from a plurality of possible contexts based on the one or more real-time sensor inputs and stored user-specific information.

The method may include automatically generating a suggestion based on the inferred user-specific context and the current location-related situation, where the suggestion may include a notification, a recommended action, and/or a prompt for user input, and the method may include presenting the suggestion at the mobile electronic device. The method may include presenting the suggestion in a textual, graphical, visual and/or audible form. The method may include selecting a method of presenting the suggestion based on the inferred user-specific context and/or the current location-related situation. The method may include communicating the suggestion to another electronic device. The method may include comparing the real-time sensor inputs to at least one stored pattern of user activity. The method may include modifying at least one stored pattern of user activity in response to one or more of the real-time sensor inputs. The method may include determining whether the current location-related situation relates to an often-repeated pattern of user activity. The method may include determining whether to generate a suggestion based on whether the current location-related situation relates to an often-repeated pattern of user activity. The method may include monitoring the real-time sensor inputs and the stored user-specific information over time and automatically learning a user-specific pattern of activity based on the monitoring. The method may include automatically generating the plurality of possible contexts based on the one or more real-time sensor inputs and the stored user-specific information.

According to at least one aspect of this disclosure, a method for automatically inferring a user-specific current context with a mobile electronic device includes receiving one or more real-time inputs from one or more sources, at the mobile electronic device; applying an activity knowledge base to determine a current situation based on the one or more real-time inputs and stored user-specific information from a plurality of software applications; and using automated reasoning to infer a user-specific context of the current situation from a plurality of possible contexts based on the one or more real-time inputs and the user-specific information from a plurality of software applications.

The sources of real-time inputs may include one or more sensors, peripheral devices, software applications, communication networks, and/or embedded systems. The sensor(s) may include one or more sensors that are integrated with the mobile electronic device and/or one or more sensors that are not integrated with the mobile electronic device. The sources of real-time inputs may include one or more social-media software applications, instant messaging systems, voice communication systems, and/or real-time information feeds.

The method may include determining, based on the one or more real-time inputs, a location-related aspect of the current situation, where the location-related aspect relates to a geographic location or a change in geographic location detected by the source of the real-time input. One or more of the real-time inputs may include publicly available information, and the method may include determining a degree of urgency associated with the publicly available information and generating a suggestion based on the inferred user-specific context of the current situation and the degree of urgency associated with the publicly available information. One or more of the real-time inputs may include a digital image, and the method may include deriving information relating to the current location-related situation from the digital image.

According to at least one aspect of this disclosure, a method for determining whether to present an automated suggestion at a mobile electronic device includes, with the mobile electronic device: determining a current situation from one or more real-time inputs received at the mobile electronic device and stored user-specific information; inferring a user-specific context of the current situation from a plurality of possible contexts based on the one or more real-time sensor inputs and stored user-specific information; and analyzing the user-specific context with an activity knowledge base to determine whether to generate an automated suggestion at the mobile electronic device.

The method may include automatically generating the plurality of possible contexts, where one or more of the possible contexts relates to an often-repeated situation and one or more of the possible contexts relates to a not-often-repeated situation. The method may include determining not to present an automated suggestion in response to the user-specific context corresponding to an often-repeated situation. The method may include presenting the automated suggestion in response to the user-specific context corresponding to an often-repeated situation. The method may include presenting the automated suggestion in response to the user-specific context corresponding to a not-often-repeated situation. The method may include selecting a method of presenting the automated suggestion based on the user-specific context corresponding to a not-often-repeated situation and presenting the automated suggestion according to the selected method. The method may include determining not to present an automated suggestion in response to the user-specific context corresponding to a not-often-repeated situation.

According to at least one aspect of this disclosure, a method for responding to a current situation pertaining to a location, position, or movement of a person in relation to a physical environment, the method comprising, with a mobile electronic device: receiving one or more real-time inputs; applying a knowledge base to determine the current situation from the one or more real-time inputs and stored user-specific information; using automated reasoning to infer a user-specific context of the current situation from a plurality of possible contexts based on the one or more real-time sensor inputs and stored user-specific information; and automatically responding to the current situation based on the inferred user-specific context.

The method may include automatically responding by executing an electronic transaction using software at the mobile electronic device. The method may include automatically responding by sending a communication relating to the inferred user-specific context to another electronic device. The method may include determining, from the inferred user-specific context, one or more recipients for the communication and sending the communication to the one or more recipients over an electronic network. The method may include automatically responding by storing data relating to the inferred user-specific context in the knowledge base. The method may include automatically responding by receiving one or more other real-time inputs at the mobile electronic device and repeating the determining, inferring, and automatically responding. The method may include automatically responding by activating a source of real-time inputs to receive the one or more other real-time inputs. The method may include determining a current level of confidence associated with the inferred user-specific context and selecting a method of automatically responding based on the current level of confidence. The method may include generating a candidate action based on the inferred user-specific context; determining a current level of confidence associated with the candidate action; and based on the current level of confidence, determining whether to present the candidate action, automatically execute the candidate action, defer the candidate action until a later time, or discard the candidate action.

A computing device may include at least one processor and computer circuitry coupled to the at least one processor, wherein the computer circuitry is arranged to cause the at least one processor to perform any of the foregoing methods. One or more machine-accessible storage media may include instructions that in response to being executed result in a computing device performing any of the foregoing methods.

BRIEF DESCRIPTION OF THE DRAWINGS

This disclosure is illustrated by way of example and not by way of limitation in the accompanying figures. The figures may, alone or in combination, illustrate one or more embodiments of the disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
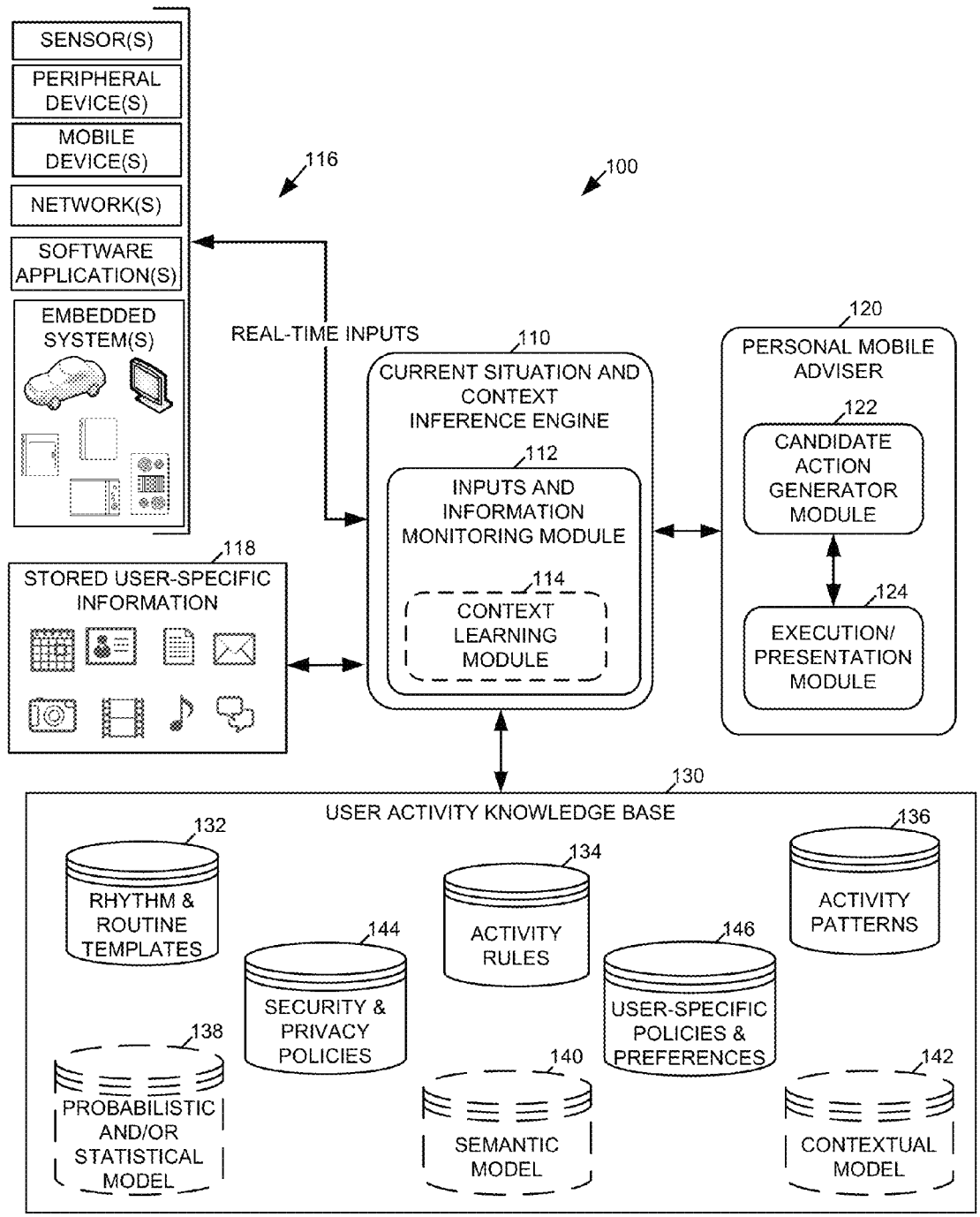
FIG. 1 is a simplified module diagram of at least one embodiment of a system for automatically inferring a mobile user's current context.

While the concepts of the present disclosure are susceptible to various modifications and alternative forms, specific embodiments thereof are shown by way of example in the drawings and are described in detail below. It should be understood, however, that there is no intent to limit the concepts of the present disclosure to the particular forms disclosed, but on the contrary, the intention is to cover all modifications, equivalents, and alternatives consistent with the present disclosure and the appended claims.

Overview

Referring now to FIG. 1, a system 100 includes a current situation and context inference engine ("inference engine") 110, which is designed to integrate multiple sources and types of information about a mobile device user's virtual and physical existence in ways that are personalized and helpful to the user. In accordance with the user's privacy and security preferences, the inference engine 110 makes intelligent inferences about the user's current activity in the physical world based on the many sources and types of data that are available to the mobile device. By "intelligent," we mean that the inference engine 110 can use automated reasoning methods and/or other techniques to make useful inferences, particularly in situations in which the user's current situation or context may be uncertain. For instance, on a given day, there may be a number of possible reasons why the user may be at a particular location at a particular time. In such situations, the inference engine 110 applies artificial intelligence methods, algorithms, and/or techniques to infer one or more context scenarios that are probable given the various inputs. Further, the inference engine 110 can make such inferences without any request or instruction from the user.

The illustrative inference engine 110 applies aspects of a user activity knowledge base ("knowledge base") 130 to real-time inputs 116 received at the mobile device and electronically-stored user-specific information ("stored information") 118 that may be accessible to the mobile device. The inference engine 110 makes determinations about the user's current "real-world" situation (e.g., the user's current placement or position with regard to his or her physical environment and/or geographic surroundings). The inference engine 110 enhances those determinations with a personalized understanding of the context that is relevant to the user's current situation (e.g., the particular information and/or circumstances that relate to the user's current situation). In cases where the user's current situation and/or context may be uncertain or the number of real-time inputs 116 and/or stored information 118 may be very large or diverse, the inference engine 110 uses the knowledge base 130 to determine which of the inputs and/or information 116, 118 are likely to be the most relevant to the present moment. Thus, with the user's prior permission, the inference engine 110 can automatically resolve not only where the user is physically at a given moment in time, but also what the user may be doing or planning to do in relation to his or her current location, based on a variety of different real-time inputs and user-specific information.

In addition, the inference engine 110 can automatically respond to the user's current situation and context in accordance with the user's preferences. In that regard, the illustrative system 100 includes a personal mobile adviser ("mobile adviser") 120. The mobile adviser 120 proactively acts on the user-specific current situation and context as it evolves to provide timely and relevant assistance to the user. The mobile adviser 120 includes a candidate action generator module ("action generator module") 122 and an execution/presentation module 124. The action generator module 122 automatically generates candidate actions that may be helpful to the user in view of the user's current situation and context as determined by the inference engine 110. Some examples of candidate actions (or simply, "actions") include the presenting or sending of suggestions (which may take the form of, e.g., an alert, notification, recommended action, and/or prompt for user input) to the user or to other electronic devices. Other examples of candidate actions include activities that can be performed by the mobile device on behalf of the user (with or without the user's prior approval), such as executing a software process, sending a message, communicating with other electronic devices, storing information in computer memory, etc. Additionally, the "act" of doing nothing in response to a current situation and context can be considered a candidate action in some cases.

Candidate actions may be generated at any point in time based on a variety of non-specific factors, rather than as a response to an overt request or a specific triggering event. The action generator module 122 interfaces with the inference engine 110 to decide, with or without user input, whether to generate a candidate action at a given point in time, or at all, based on the inference engine 110's assessment of the user's current situation and context. For instance, if the inference engine 110 is not able to determine the user's current situation or context with a high degree of confidence (as may be the case if the user is located in a 'dead zone,' or the mobile device is otherwise unable to receive one or more real-time inputs 116), the action generator module 122 may remain idle until the inference engine 110 has a higher degree of confidence in its assessment of the current situation or context. Once candidate actions are generated, the action generator module 122 interfaces with the inference engine 110 to determine which of the candidate actions to perform, based on the current situation and context and/or confidence levels associated with the candidate actions.

The execution/presentation module 124 considers the user's current situation and context, as determined by the inference engine 110, as well as any pertinent user-specific preferences or policies 144, 146, in determining how to perform the selected actions. The execution/presentation module 124 presents and/or executes the selected actions at the mobile device, accordingly. That is, the execution/presentation module 124 specifies the particular mode or style for executing or presenting an action to the user given the user's current context and/or preferences. The mode or style specified by the execution/presentation module 124 may be interactive (e.g., it may involve the user by asking for input or approval) or non-interactive (e.g., it may be executed autonomously by the system 100 without the user's input or approval). For example, based on the user's preferences and in view of the current situation and context, the execution/presentation module 124 may generate a suggestion and present it to the user for feedback, act autonomously to implement the suggestion, defer the presentation or execution of the suggestion to a later time, or simply discard the suggestion and do nothing at the present time. In this way, the system 100 can provide the mobile device user with timely and useful or desirable assistance even before the user recognizes or remembers the need for the assistance. Further, the system 100 can provide the assistance in a way that is appropriate for the user's current situation and context, and can thereby help the user respond appropriately to the current situation and context.

Figure 2:
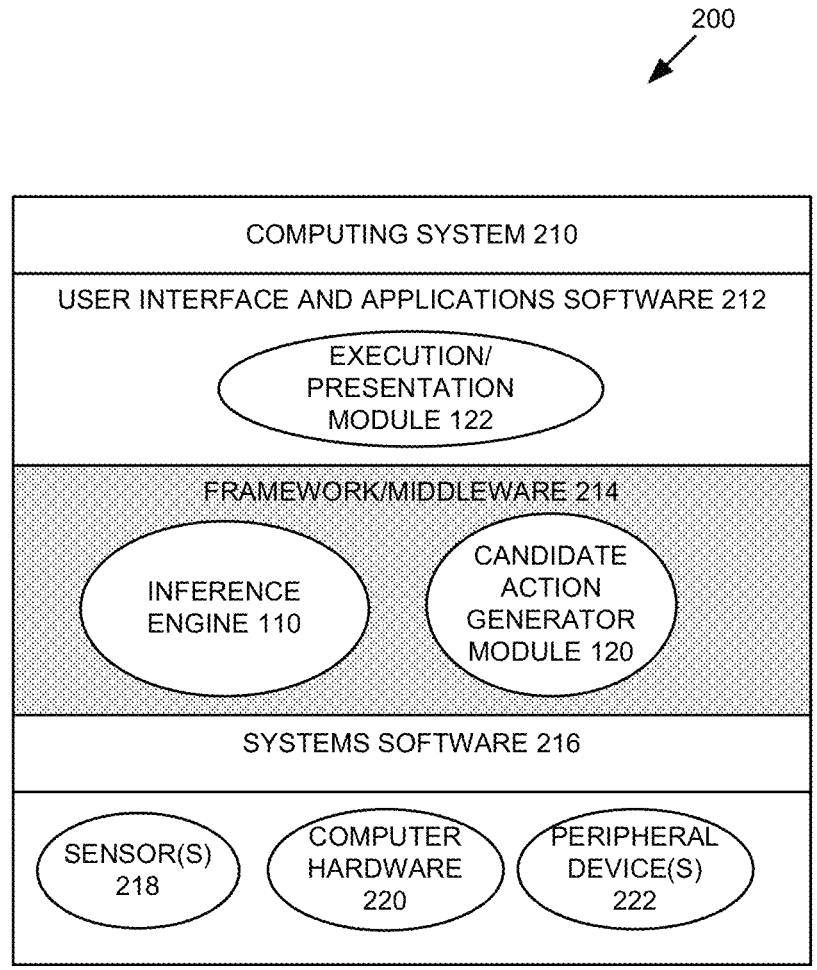
FIG. 2 is a simplified component diagram of at least one embodiment of the system of FIG. 1 in the context of an illustrative computing environment.
Figure 5:
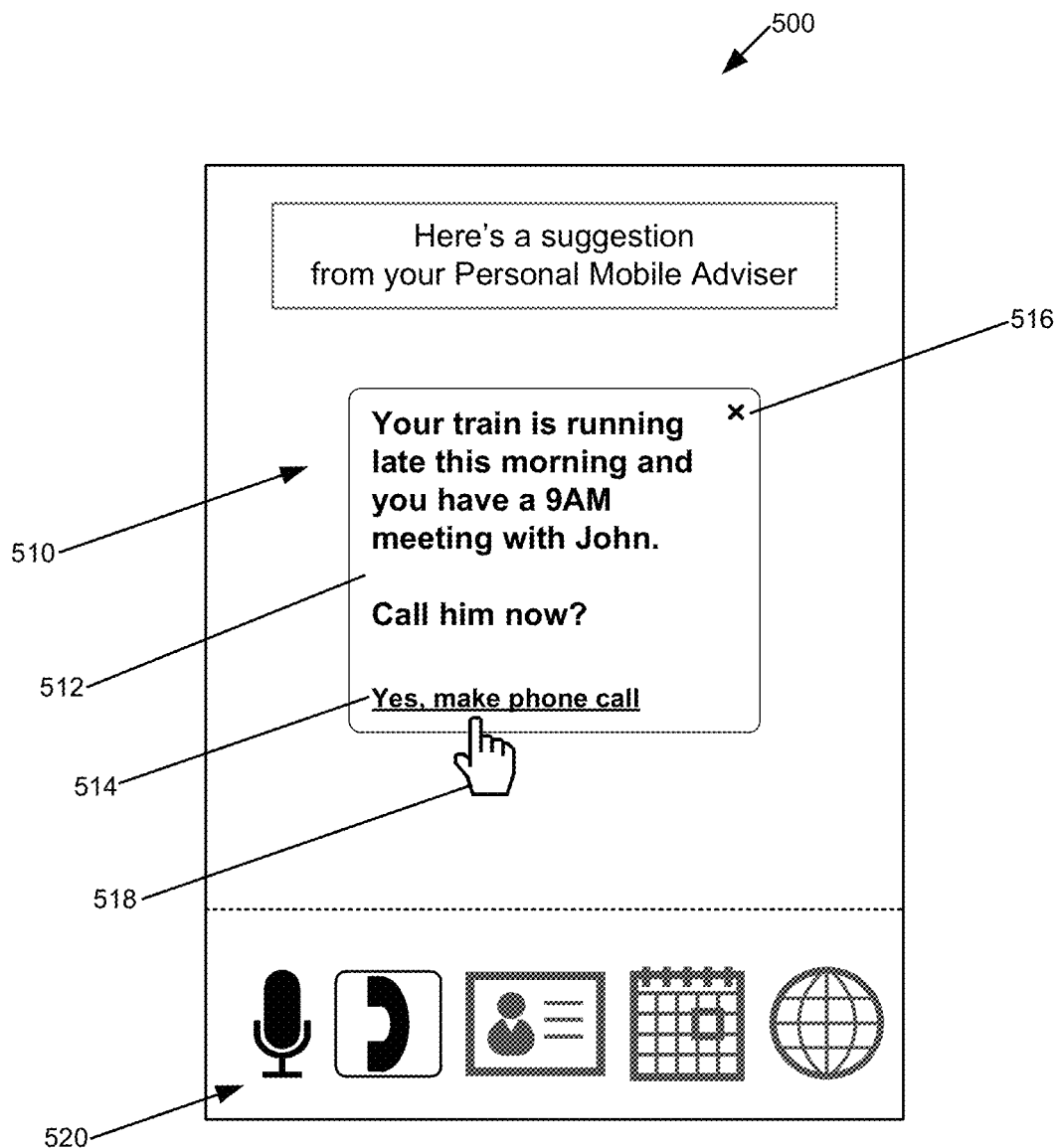
FIG. 5 is a simplified elevational view of another exemplary user interface that may be presented at an electronic device in connection with at least one embodiment of the system of FIG. 1.

As should be appreciated by those skilled in the art, the various modules 110, 112, 114, 120, 122, 124 of the system 100 are implemented as computer software, firmware, hardware, or a combination of any of these, in different embodiments of the system 100. An illustrative implementation of the modules 110, 112, 114, 120, 122, 124 is shown in FIG. 2 and described below. The mobile device referred to herein may be implemented as any suitable mobile, handheld, or portable electronic device, including a cellular phone, smartphone, tablet computer, personal digital assistant, laptop computer, portable Internet device, netbook, e-reader, body-mounted device, such as a physiological monitor or tracking device, head-mounted device (e.g., goggles, glasses, earpiece, headset and/or others), wrist or arm-mounted device (such as a wristwatch, wrist-mounted GPS device and/or others), or neural or body implant; vehicle-mounted device (e.g., an in-vehicle computer system or display), entertainment system (e.g., a portable music, video, and/or gaming system), and/or others, alone or in combination with other devices and/or systems. An exemplary implementation of the mobile device is shown in FIG. 5 and described below.

Monitoring of Real-Time Inputs and Stored Information

In some embodiments, the inference engine 110 includes an inputs and information monitoring module ("monitoring module") 112. The illustrative monitoring module 112 receives a number of electronic real-time inputs 116 and monitors those inputs as they occur at various points in time. In the illustrative embodiments, the real-time inputs 116 are automated in the sense that overt action by the user of the mobile device is not required in order for the inputs to be received by the mobile device or processed by the inference engine 110. In some embodiments, the real-time inputs 116 may include notifications that the user has previously configured or agreed to receive, but which now occur automatically without the user's involvement. Further, the real-time inputs 116 may include inputs that are initiated by or as a result of a person using another computing device and are automatically received by the mobile device. Such inputs may include, for example, text messages, voice messages, and phone calls, as well as electronic notifications that may generated by specialized software applications based on a change in information relating to another person, place or thing (e.g., messages generated in or by FACEBOOK, GOOGLE+, LINKEDIN, TWITTER, FOURSQUARE, TWIST, and/or other applications). The real-time inputs 116 may be automatically generated by various electronic or electromechanical components of the mobile device itself or received by the mobile device from other devices or systems (e.g., over a wireless network).

Potential sources of real-time inputs 116 include sensors, peripheral devices, other mobile devices, communication networks, software applications, embedded systems, and/or others. Thus, in some embodiments, the real-time inputs 116 may include structured data (e.g., data arranged or organized in a specific format or according to a particular communication protocol, or which is otherwise easily searchable, presentable or usable by a computing device or user), unstructured data (e.g., natural language inputs, other inputs that originate with an analog source, and text or non-text data that is not easily searchable, presentable, or usable in its original form, such as free text blog, social media, or instant message postings), or a combination thereof.

Some examples of sensors and other devices that may be the source of real-time inputs 116 include inertial sensors (e.g., motion, angle, and/or rotation sensors, such as accelerometers, inclinometers, and the like), proximity sensors, wireless transceivers, Global Positioning System (GPS) transceivers, optical sensors (e.g., scanners, cameras, and the like), light sensors (including visible or non-visible forms of light, e.g., infrared and ultraviolet radiation), tactile sensors, force sensors, pressure sensors, radio frequency transmitters and/or receivers, antennas, audio sensors (e.g., microphones), inductive transceivers, temperature sensors, biometric sensors (e.g., fingerprint scanners or other devices that can recognize voice, iris and/or other facial features or other human biological traits), biosensors, compasses, and/or others. Any one or more of the foregoing and/or other sensors may be integrated with the mobile device and/or embodied in another device that is capable of transmitting signals that can be received by the mobile device (e.g., medical devices and/or body-mounted electronic devices, vehicle sensors, communication or control systems, and/or others).

Some examples of real-time inputs 116 that may be provided to the system 100 by sensors and/or other devices include indicators of geographic location (e.g., the location of the user and/or nearby people, places, or things), changes in location (e.g., travel from one geographic location to another), motion (e.g., whether the person is moving or stationary, how fast or slowly they are moving, etc.), changes in motion (e.g., walking to running, moving to stationary, etc.), position (e.g., whether the person is sitting, standing, or laying down, whether the person is carrying or wearing the mobile device, the way in which the mobile device is being held or worn, etc.), and/or changes in position (e.g., movement from sitting to standing or vice versa).

In some embodiments, the system 100 is configured so that one or more of the above-described sensors or other devices can sense detailed body position and motion by reading subtle electronic effects, such as the effect of the natural electrical properties of the human body on signal transmission or reception, without requiring video capture and processing of the person's movements. That is, the human body naturally acts as a capacitor, inductor, resistor, and/or antenna, and the values of these electrical properties vary with body position, what one is touching, level of sweat on the skin, etc. The antenna properties of a person with their right hand raised are different from the antenna properties with the right hand lowered. These differences can be detected and measured by a mobile device that is in close proximity to the person (e.g., being held in the person's left hand, clipped to a belt or in the person's pocket).

As an analogy, in the good old days of televisions with aerials, to achieve the best reception for different channels, one often had to reposition the antennas manually. When one went to do this, the signal was noticeably affected by the mere presence of a human body near the aerial. Some embodiments of the system 100 use that kind of effect to enable the mobile device to detect the detailed positioning of the user's limbs and/or the presence of other objects in the environment. For example, a multi-band radio frequency transmitter and receiver (e.g., a small wireless radio) built into the mobile device can be used to generate antenna patterns, which can be compared to known antenna patterns corresponding to various body positions, gestures, or movements.

In some embodiments, the system 100 is configured to account for person-to-person differences in body composition that may be relevant to the body position determination. That is, a person's natural antenna properties may vary based on the person's physical body size and/or composition (e.g., based the person's muscle vs. bone vs. fat percentages). In these cases, the system 100 can use machine learning and/or other techniques, as discussed elsewhere herein, to, over time learn how changes in body position affect the radio antenna properties for a particular individual. In other words, the mobile device can be 'trained' to the individual user.

The following illustrates a few simple examples of how a mobile device can be trained to recognize various body positions or gestures of a person without requiring a significant amount of training time on the part of the user. With the person holding a mobile device in their left hand, the mobile device can detect properties of signal propagation (e.g., transmission and reception) using the mobile device's built-in multi-band transmitter. The system 100 can then infer the person's body configuration and measure the signal propagation corresponding to the inferred body configuration, or the system 100 may command the user to assume a specific body position and then measure the corresponding signal propagation.

To infer body position, for example, the mobile device could detect if there is current skin contact with the mobile device (e.g., simply by detecting capacitance effects on a surface of the device), and based on the capacitance effects conclude that the mobile device is currently being held in the person's hand. If the system 100 determines with sufficient confidence that the person is holding the mobile in his or her hand, then the system 100 can infer other body positions. For example, the system 100 could display a button, instruct the person to press the button, and when that button is pressed, and infer that the arms are roughly forming a circle (since at the moment the button is pressed, both hands are touching the mobile device). In addition, when the mobile device's motion or position (e.g., GPS) sensor perceives a steady walking pace motion with some regular up-and-down gait indicating that the user is walking, the mobile device can infer that the person is standing upright, and that the person's legs are swinging. The mobile device can then record the signal propagation characteristics associated with these body movements.

As another example, the mobile device can be configured with a specific training application. In these embodiments, such an application instructs the user to assume a variety of different positions with the mobile device being held in a known location (e.g., raise their left arm up, while holding the phone in their right hand and vice versa). The application may display a cartoon graphic or video of the desired body position so that the person can quickly understand what body position is being requested. During each training moment, the mobile device can learn the signal propagation effects in a plurality of frequency bands based on the position of the user's limb(s) and/or torso. After a short time of such commanded body position measurements, the mobile device builds a model (e.g., as part of the knowledge base 130) of how the user's various body positions are related to the signal propagation effects.

Alternatively or in addition, the commanded body position training may be performed in several different environments. To reduce the burden on the user, the user may be asked to perform the training just once, but based on the inferring techniques described herein, and the initial (single environment) training, the mobile device can learn how the body position will interact with signals in different environments. For example, for a tall user, when an arm is reached up it may be fairly near the ceiling in a room with relatively low ceiling, thus leading to different signal propagation characteristics. While, when outside, reaching the arm up may have different effects on radio frequency signal propagation. Such additional information can be stored in the knowledge base 130 and thus improve the model of how the user's various body positions are related to the signal propagation effects in the surrounding environment.

In this way, the mobile device can know if the user is raising his or her hand, waving a hand back and forth, reaching for something, touching hands together, pointing a finger, turning the head, etc., without needing to actually observe and record these actions. The system 100 can use the information sensed about body position and/or movement to help infer the user's context. As just one example, if a person is riding in a car with a mobile device in a shirt pocket, the person being in driving position with hands on the steering wheel will be associated with a characteristic electrical effect on signals transmitted by the mobile device, while an arms-down passenger posture will have a very different characteristic signature effect. Similarly, the system 100 may detect and use information about the surrounding physical environment, such as the presence or absence of other mobile devices or transmitters that may not belong to the user, to make inferences about the user's current situation and context. In the above example, if signals are received from another electronic device, the system 100 may conclude that another occupant is in the vehicle.

The system 100 may use this information to infer with greater confidence that the user is driving, as opposed to riding as a passenger, and may then tailor candidate actions, suppress alerts or other distractions, etc., accordingly. For instance, in some embodiments, the system 100 compares a current signal pattern against one or more signal patterns it has previously learned or stored in the knowledge base 130 (e.g., a signal pattern for the user in their standard driving position). If the patterns match with an acceptable level of confidence, the system 100 can conclude that the user is likely driving; whereas if the match is very poor then the system may conclude that it is more likely that the person is a passenger, or may defer a conclusion until more information is available.

The above-described method for electronically sensing body position is useful not only for helping a mobile device infer a user's context and situation, but can be used in other embodiments to remotely control other electronic devices. That is, the method provides a sensing mechanism that can be used to detect user gestures and the like, without requiring the user to actually touch or handle the mobile device, and without requiring a video camera or other similar image sensor to observe the user's movements.

Biosensors, such as internal or external sensing devices associated with medical devices (e.g., insulin pumps, pacemakers, heart assist devices, brain stimulators (e.g., for Parkinson's disease)) used by the person can also be a source of real-time inputs 116. In some embodiments, data from the biosensors (such as fluid/battery level, use patterns, drug concentration, etc.) is monitored by the system 100. For example, based on the person's calendar entries for the day or other stored information 118, the system 100 can, if the real-time inputs 116 indicate that fluid or battery level is low, suggest a recharge before the person leaves for a long trip or to a meeting a distance away. As another example, if an anomaly is detected (e.g., via a special medical device software application), the system 100 may send an electronic notification including the pertinent data to the person's doctor or other healthcare professional. Further, in some embodiments, the system 100 may be configured to, using the mobile device, detect information from biosensors associated with multiple persons, as in the case where a doctor or other healthcare professional is managing a number of different patients in a facility. In such a scenario, the healthcare professional's mobile device may receive pertinent information about a number of patients at once.

Some examples of peripheral devices that may provide real-time inputs 116 include various electronic devices that may be incorporated into or in communication with the mobile device, such as sound, video, or graphics adapters, network interfaces, microphones, still and/or video cameras, gaze tracking systems (e.g., one or more of those described in U.S. patent application Ser. No. 13/158,109 to Senanayake et al, filed Jun. 10, 2011, and/or U.S. patent application Ser. No. 13/399,210 to Senanayake et al, filed Feb. 17, 2012), bar code scanners, magnetic card readers (e.g. credit card, debit card, gift card, loyalty card, and/or identification card readers, such as THE SQUARE), digital media player/recorders, telephony devices, and/or others. Some examples of real-time inputs 116 that may be received or provided by peripheral devices include spoken words (e.g., via a natural language interface), digital images, voice messages, text messages, phone calls, bar codes and other security codes, and live or streaming digital media (e.g., audio and/or video).

Other mobile devices (e.g., wireless electronic devices such as cellular phones, smartphones, multi-function devices, remote consoles for television, media, gaming or entertainment systems, etc.) may also be a source of real-time inputs 116. For instance, other mobile devices may act as sources of context information. As an example, if a couple of friends each are carrying mobile devices (e.g., cell phones), and are in close physical proximity to one another (as determined by, e.g., the mobile device noting their GPS or gryoscoptic-interpolated positions being similar), and one of the mobile devices determines with high confidence something important about the person's current context, the mobile device can electronically push that information to the other nearby phones over a cellular, WI-FI, or other electronic communication network. Alternatively or in addition, such information can be used by the system 100 as additional real-time inputs 116, to influence (and presumably improve) the inference engine 110's assessment of the current situation and context.

Some examples of communication networks and/or systems from which real-time inputs 116 may be obtained include public, private, and limited-access wired and/or wireless communication systems (including mobile/cellular, wireless broadband, broadband Internet (e.g., DSL, cable), Ethernet, WI-FI, Virtual Local Area Network (VLAN), BLUETOOTH, Virtual Private Network (VPN), Near Field Communication (NFC), and/or others, including the Internet). Some examples of real-time inputs 116 that may be provided via communication networks include sensor data transmitted by other devices and information or content transmitted to the mobile device by network-based systems (e.g., automated notifications such as those relating to publicly available information; for example, weather advisories, traffic alerts, AMBER and other emergency alerts, news alerts, and the like).

Real-time inputs 116 are provided by mobile device software applications, in some embodiments. Some examples of real-time inputs 116 that may be provided by various software applications installed on or used by the mobile device include application-specific automated reminders, alerts, and messages, such as personal health reminders (e.g., medication, diet or exercise reminders), banking, finance, or investment notifications (e.g., payment reminders, overdraft notifications, etc.), shopping or purchase-related notifications (e.g., coupons or special deals), privacy or malware-related alerts, social media updates (e.g., status updates, wall postings, TWEETS, etc.), news feeds or alerts, and the like, as well as location-related information (e.g., maps, driving directions, etc.) that may be generated in real time (e.g., by GPS or other navigation software). Clock/calendar software applications for mobile devices also provide real-time inputs 116 in the form of automated clock/calendar data (e.g., the current month, day, year, time and time zone).

Embedded systems are a source of real-time inputs 116, in some embodiments. Generally speaking, embedded systems include any "smart" devices or systems that are not normally configured as a general-purpose computer, such as in-vehicle control, communication, and/or entertainment systems (e.g., systems for cruise control, traction control, stability control, anti-lock braking, crash control or crash prevention, etc., as well as in-vehicle media players, navigation systems, gas and/or mileage information systems, and diagnostics systems, for cars, motorcycles, trucks, busses, airplanes, trains, and the like), appliances (e.g., kitchen or laundry appliances, such as refrigerators, microwave ovens, coffee makers, washers and dryers), music and/or home theater or gaming systems, clocks, radios, televisions, "Internet" televisions, and the like), portable devices such as digital watches, digital media players, and digital cameras; digital musical instruments, office equipment (e.g., printers, scanners, and copiers), transportation systems (such as traffic lights and land or air traffic control systems), climate control systems (e.g., HVAC systems), building security systems, surveillance systems, medical equipment (e.g., vital signs monitoring systems, medical imaging systems, etc.), and/or others.

Some examples of real-time inputs 116 that may be provided by embedded systems include status, diagnostic, and/or alert signals from the various devices and systems, such as signals that indicate whether a device or system is operating normally or has a problem, as well as data signals. In the context of vehicle systems, such signals may indicate the vehicle's current speed or location, whether the gas tank is full or approaching empty, whether the vehicle has experienced an impact, etc. Real-time inputs 116 that may be provided by appliances and/or other devices include signals indicating whether a timer is set and/or the amount of time left on the timer, whether an operating cycle (e.g., wash/dry) has started, is in progress, or completed, and/or others. It should be appreciated by those skilled in the art that many other real-time inputs are possible, and the foregoing examples are intended to be illustrative and non-limiting. Some examples of techniques for enabling interaction of the system 100 with distributed electronic agents or "objects" are described in Cheyer et al., U.S. Pat. No. 6,859,931 and Cheyer et al., U.S. Pat. No. 7,069,560. However, this disclosure is not limited to such techniques; other similarly suitable techniques may be used, including standard WI-FI inter-device communication techniques.

The monitoring module 112 also considers the stored information 118 that may influence the inference engine 110's determinations relating to the context of the real-time inputs 116. For instance, prior to or at the beginning of a new day, the monitoring module 112 may automatically review the stored information 118 to find and index or filter specific details that may be relevant to the user's activity on that day. As an example, the monitoring module 112 may extract meeting and appointment details for the day from the user's calendar application. Some examples of techniques that may be used to identify and/or assemble stored information 118 that may be relevant to a user's particular current situation and context and/or one or more real-time inputs 116 are described in Nitz et al., U.S. Patent Application Publication No. 2012/0131020, which is incorporated herein by this reference in its entirety. However, this disclosure is not limited to such techniques; other similarly suitable techniques may be used, including standard goal-based search algorithms and problem-solving or knowledge-based approaches, among others.

Many types and sources of stored information 118 can be automatically identified and reviewed by the monitoring module 112 to elicit details that may be pertinent to the user's current context, such as calendar information, meetings and appointments, plans and schedules, contacts information (e.g., address books, social media "friends" or "connections" lists, email or message distribution lists, etc.), electronic documents or blog posts recently created, viewed, or edited by the user; voice, text or email messages recently accessed, sent or received; music, pictures or videos recently taken, viewed, downloaded, or listened to, social media posts recently made by the user or received by the user from other persons (e.g., status updates, tweets, wall posts, checkins, etc.), and/or others. As should be apparent to those skilled in the art, the stored information 118 may be obtained from a number of different software applications and/or other electronic sources and stored in any suitable format (e.g., datasets, database tables, data files, etc.). Thus, the stored information 118 may include structured data, unstructured data, or a combination thereof.

In some embodiments, the monitoring module 112 may analyze, categorize or classify the various real-time inputs 116 and/or stored information 118 of which it becomes aware in a number of different ways. For example, in some embodiments, the monitoring module 112 creates associations between or among real-time inputs 116 and/or stored information 118 that may appear to be related or logically connected in some way. In some embodiments, semantic meanings may be associated with the real-time inputs 116 and/or stored information 118 (using, e.g., semantic tagging or metadata). Some examples of methods and techniques for extracting pertinent information from unstructured data, tagging the unstructured data with semantic information, and drawing inferences from the information are described in Donneau-Golencer and Nitz, U.S. patent application Ser. No. 13/287,985, filed Nov. 2, 2011, which is incorporated herein by this reference in its entirety. However, the present disclosure is not limited thereby. Various forms of unstructured data may be processed using standard pattern recognition algorithms, clustering techniques, and/or other suitable methods.

In the case of digital media (e.g., audio, graphic, still photo and/or video) that may be processed as real-time inputs 116 (e.g., captured live or streamed inputs) and/or stored information 118 (e.g., stored files), some techniques for deriving semantic information therefrom are described in Sawhney et al., U.S. patent application Ser. No. 13/484,520, filed May 31, 2012. Some additional examples of digital media analysis methods and techniques include those described in Cheng et al., U.S. Pat. No. 7,835,578 (analyzing video and automatically generating semantic descriptions); Hanna et al., U.S. Pat. No. 7,639,840 (analyzing video to classifying moving objects); Meyers et al., U.S. Pat. No. 7,171,046 (performing optical character recognition on text contained within a video using a portable device); and Wixson, U.S. Pat. No. 6,037,976 (determining ambient conditions such as fog, haze, etc., from images or video). However, this disclosure is not limited by the foregoing examples and other suitable methods and techniques, such as standard digital image analysis techniques, may be used to derive useful information from digital media inputs.

Regarding audio processing (whether captured live, streamed, or stored clips), some techniques that can be used to analyze the audio and extract useful information include clustering and weighting methods (using, e.g., a bag of words model). For example, such techniques may be used to algorithmically recognize, from the digital audio, events or scenes such as weddings, birthday parties, parades, concerts, or even if the user is near a road, train, airport or other location with distinctive audio characteristics. As another example, audio cues such as beeping walk signs in a busy intersection can be used by the system 100, together with other information such as body position (sitting in a car, or standing or walking) to inform decisions on the timing of messages or interruptions of the user: a notification might best be given to the user when they are standing on the sidewalk waiting to cross a busy intersection, rather than while they are crossing it. In these and other ways, the system 100 can use live audio or video to inform its understanding of the user's current situation and context and generated automated responses thereto.

In some embodiments, the monitoring module 112 monitors the user's implicit or explicit responses to the actions that are presented or executed by the personal mobile adviser 120 (or the lack of any such actions, as the case may be). In these instances, the monitoring module 112 may process and store the user's feedback in the knowledge base 130 and/or forward the feedback to the context learning module 114, described below.

Results of the monitoring and analysis of the real-time inputs 116 and the stored information 118 are stored in the knowledge base 130 and may be considered by the inference engine 110 in determining the mobile user's current situation and context at any given point in time. As should be appreciated by those skilled in the art, aspects of the monitoring module 112 may run continuously (e.g., as a background process) in some embodiments, while in other embodiments, an affirmative action of the user may be required to turn the monitoring on or off. While shown in FIG. 1 as a sub-module of the inference engine 110, the monitoring module 112 may be implemented as a separate module that interfaces with or operates relatively independently from the inference engine 110.

For instance, the monitoring module 112 may continuously monitor and analyze the real-time inputs 116 (e.g., as they occur) and post current situation data to the knowledge base 130, such that the inference engine 110 interfaces directly with the knowledge base 130 to determine the mobile user's current situation and context. In interfacing with the knowledge base 130, the monitoring module 112 may use, e.g., a "push" data transmission paradigm wherein data is posted to the knowledge base 130 automatically as it occurs or on a periodic basis, or a "pull" data transmission paradigm wherein data is posted to the knowledge base 130 in response to requests from the knowledge base 130 or the personal mobile adviser 120.

User Activity Knowledge Base

Referring further to FIG. 1, the illustrative knowledge base 130 includes one or more indexed or otherwise searchable stores of knowledge (e.g., databases, lookup tables, or the like) ("knowledge stores") 132, 134, 136, 138, 140, 142, 144, 146. Each of the knowledge stores 132, 134, 136, 138, 140, 142, 144, 146 contains or references data, arguments, parameters, and/or machine-executable predictive models and algorithms that can be applied by the inference engine 110 to the real-time inputs 116 and/or stored information 118 to interpret and make inferences about the mobile user's current activity. In some embodiments, the knowledge base 130 may include representations or assertions about the user's current situation and/or context (which may be referred to as sentences or axioms, as those terms are understood in the artificial intelligence arts), as well as goals that may likely be associated with various situations and/or contexts. Any or all of the knowledge stores 132, 134, 136, 138, 140, 142, 144, 146 may be configured for searching and sorting in a number of ways using currently available techniques (or similarly suitable later-developed techniques), such as machine-executable keyword, text, and/or meta data search algorithms.

In some embodiments, the knowledge base 130 includes associations between or among instances of system-level characterizations (e.g., raw data, computer code, arguments, or parameters) of real-time inputs 116 and stored information 118, and "high-level" characterizations of that data, so that the sensor data or other information can be understood at a high level and/or linked or associated with other data based on a common understanding of the data. For example, a series of real-time inputs 116 from a motion sensor may be interpreted as indicating that the user is currently walking as opposed to riding in a vehicle. In this case, the associated high-level characterization of the real-time inputs 116 may simply be "walking." Such associations may be generated by the inference engine 110 with the use of one or more artificial intelligence models that may be embodied as machine-executable algorithms, arguments, parameters and/or data, and stored in, for example, a probabilistic model 138, a semantic model 140, and/or a contextual model 142, described below.

The knowledge base 130 includes stored activity-related templates 132, rules 134, and patterns 136, which the system 100 uses to interpret and determine the context of the real-time inputs 116 in view of the stored information 118, and to generate context-appropriate candidate actions relating to the user's current situation. Initially, when a person first begins using a mobile device equipped with the system 100, the templates 132, rules 134, and patterns 136 are general in nature and based on determinations that have been previously made (through, e.g, historical data, research, crowd-sourcing techniques, etc.) about activities that are considered normal or typical for a relevant population of users. These "default" templates, rules, and patterns may be defined at any one or more levels of granularity.

For example, in some embodiments, the default templates, rules, and patterns may be determined according to a broad population of mobile device users, while in other embodiments, the defaults may be set according to the user's geographic location, age, gender, ethnicity, or any combination of these and/or other pertinent factors. The default templates, rules, and patterns can be selected, configured and/or modified by the user initially at start-up and over time in an interactive and user-friendly manner (e.g., via graphical or natural language user interface at the mobile device). In addition, the default templates, rules, and patterns can be automatically modified and adapted to the user's personal lifestyle over time by a context learning module 114, described below.

The templates knowledge store 132 includes data relating to groups or combinations of physical activities that tend to occur regularly in a logical or temporal sequence. For example, a "weekday" template may specify typical morning activities, such as a wakeup time and activities often connected with the wakeup time (e.g., exercise, breakfast at home or on commute, messages read, etc.), typical mid-day activities, such as a time for lunch and related activities (e.g., news browsed, phone calls made, messages answered, walk around the office, etc.), and/or typical evening activities, such as a typical time for dinner and related activities (e.g., dinner at home or at a drive-thru or restaurant, pick up kids from school or after-school activities, meet with clients, etc.).

A "weekend" template may specify different activities that are associated with morning, mid-day, evening, or other times of the day. If the mobile user's work schedule involves working from Monday to Friday, the weekend template may specify a less-rigid schedule than a weekday template. If the mobile user attends school during the week and works on weekends, however, the opposite may be true. For some mobile device users, a weekday template may specify a wakeup time of 5:30 or 6:00 a.m. while a wakeup time associated with a weekend template may be 8:00 or 9:00 a.m. For others, the weekend template may specify an earlier wakeup time than the weekday template.

Such templates can be defined at any level of granularity, for instance, the templates 132 may include daily, weekly, monthly, yearly or seasonal activities, to the extent that the activities may be likely to affect the user's current context from time to time. For example, events that have a set date or time, such as birthdays, holidays, anniversaries, sports competitions, and healthcare appointments, can be incorporated into one or more of the templates 132.

In some embodiments, the templates knowledge store 132 includes data relating to not only anticipated or actual schedules or routines of the mobile user, but also personalized "rhythm" data. Whereas routine templates typically specify activities and context scenarios that occur according to rigid schedules (e.g., a staff meeting is always scheduled at 9:00 a.m. on the third Tuesday of every month), rhythm templates specify activities of a more general nature, the details of which can be changed in response to real-time inputs 116 and/or stored information 118, or as the system 100 learns more about the user, the user's current situation and/or context. For example, a rhythm template may specify that lunch occurs daily at 11:45 a.m., but the particular location, attendees, duration and/or meal details can vary on a daily basis.

Another aspect of rhythm templates relates to the user's "tempo" of activity, which may be derived at least in part over time from the real-time inputs 116 and/or the sheer number of activities scheduled or performed by the user during certain periods of time. The tempo of activity refers to aspects of the user's lifestyle that are associated with motion or pace. As an example, the user's rate or pace of activity may increase significantly prior to or during certain holidays or times of the year (e.g., month-end, quarter-end, or year-end) and may slow down markedly during other times of the year (e.g. summer vacation). The inference engine 110 may derive tempo information from, for example, real-time location data (e.g., by observing the number of different locations a user visits during a given time period) or stored calendar or communications information (e.g., by the number of meetings the user attends or the number of phone calls or messages the user sends or receives during a given time period).

Rhythm templates that incorporate tempo information enable the inference engine 110 to consider the user's current or anticipated rate or pace of activity in making inferences about the user's current situation and context. As an example, if the mobile user typically has a high rate of work-related activity toward the end of a calendar quarter (as determined from a rhythm template 132), and the inference engine 110 observes that the user may be driving near a shopping center on a Saturday morning, rather than inferring that the user is likely to stop at the shopping center, the inference engine 110 may instead infer that, more likely, the user is on his or her way to the office and therefore not likely to want to stop at the shopping center. However, if the user's pace of activity typically slows down in July or August, or on a Sunday afternoon, for example, the inference engine 110 may infer that the user may be more likely to stop and browse at the shopping center.

The illustrative rules knowledge store 134 includes rules (in the form of, e.g., conditional statements, if-then logic, truth tables, etc.), data, arguments, and/or parameters that may be used by machine-executable logic of the inference engine 110 to interpret the real-time inputs 116, make inferences about the mobile user's current situation and context, determine whether to generate a candidate action, and/or determine how to present a given candidate action at the mobile device. Some of the rules 134 may be pre-established (e.g., "default" rules) in much the same way as default templates. Other rules may be automatically created over time as the system 100 learns about the user's activity. In either case, some of the rules 134 may be modifiable by the user or the system 100 while others are non-modifiable. Modifiable rules may be changed based on explicit user behavior (such as the user taking some action to decline or delete a system-generated candidate action), by implicit user responses (e.g., the user simply ignores a system-generated candidate action), based on details the system learns over time (e.g., whenever the user is driving a car, the user prefers candidate actions to be presented audibly), or based on the user's current situation and/or context (e.g., if the user has a busy day, no candidate actions should be offered). An example of a pre-set, non-modifiable rule may be a rule that interprets certain sensor data as indicating that the user is walking at a slow rate as opposed to running or riding in a vehicle. An example of a modifiable rule may be a rule that instructs the inference engine 110 to offer a particular candidate action when the user is detected at a specific geographic location. The rule may be modified based on a user's routine or rhythm template. For example, the system may offer a different candidate action depending on the particular day of the week or time of day that the user is at the geographic location.

As an example, if in the normal case the user passes by a grocery store on the way home from work, the default rule may be to offer a suggestion to make a frequently-repeated purchase (e.g., milk, eggs, etc.) at the grocery store. However, if on a given day the user is driving by the grocery store but, rather than heading home, is in a hurry on the way to the airport, the rule may be modified so that based on the user's current motion data (in combination with calendar information that may indicate the imminent trip, potentially), no suggestion is made.

The knowledge base 130 can associate rules 134 with specific templates 132. For instance, rules 134 can be associated with certain days of the week, months of the year or seasons, or other relevant time periods. As an example, a rule may specify that since the user's child has soccer practice on Thursdays, if today is Thursday and the user is running late at work, the mobile device should suggest that the user call a friend to take the child to soccer practice.

Rules 134 can be associated with certain real-time inputs 116 and/or stored information 118. For instance, rules 134 may be associated with certain types of alerts or certain persons, places or things about which information is maintained in the stored information 118. As an example, a rule may specify that if the mobile device receives a storm advisory from the National Weather Service, the mobile device should suggest that the user make a call or send a message to his or her family or friends. Another rule may specify that each time the user has a meeting scheduled with a particular person in the user's contact list, the mobile device should suggest, prior to the meeting time, that the user check the person's social media page(s) or web site for potentially relevant information. These and other rules can be established or modified as the system learns more about the types of alerts or notifications that the user wants or does not want.

In some embodiments, an activity patterns knowledge store 136 includes data relating to comparisons performed by the inference engine 110 of the mobile user's physical activity (as determined based on the real-time inputs 116 and stored information 118) to stored rules 134 and/or templates 132, e.g., to determine whether the user's current activity is part of a normal or typical routine or schedule, whether the user's current activity represents a short-term departure therefrom, or whether the user's current activity is part of a new routine that may replace or supplement an existing routine. For example, an activity pattern 136 that may be learned over time by the inference engine 110 may be that the user typically arrives five minutes late to certain meetings, or the user typically only responds to messages at certain times of the day. Some of the activity patterns 136 may be pre-established (e.g., "default" patterns that define punctuality, etc.) in much the same way as default templates and default rules. Other patterns 136 may be automatically created over time as the system 100 learns about the user's activity.

The templates 132, rules 134, and patterns 136 may be established and/or prioritized based on any suitable criteria for determining the relevance of the particular template, rule, or pattern to the mobile user's current situation and context. Such criteria may include the recency or frequency of previous activities, historical usage patterns, crowd-sourced statistics, and/or other methods. In general, many different factors can be used to determine the degree to which a particular template, rule, or pattern may be relevant to the mobile user's current situation and context. Those factors that are more personal to the user may be considered to be of potentially greater significance. Indicators of the relevance of particular templates 132, rules 134, and patterns 136 to various situations and contexts may be stored in the knowledge base 130.

In some embodiments, a probabilistic and/or statistical model 138 includes data relating to the likelihood, probability, or degree of confidence or certainty with which inferences or determinations can be made by the inference engine 110, such as data relating to the likelihood that certain physical activities may occur on certain days or at certain times, the likelihood that some activities may logically follow other activities, or the likelihood or probability that certain candidate actions may be relevant to or appropriate in particular situations and/or contexts.

Bui et al., U.S. Patent Application Publication No. 2009/0307162, describes a Logical Hidden Markov Model that is one example of a probabilistic model that may be used for activity modeling. Some other modeling techniques are described in various research papers authored or co-authored by Hung H. Bui, including a Hidden Permutation Model for learning and recognizing high-level activity routines, a Hierarchical Hidden Markov Model for recognizing people behaviors, and a Coxian duration model for learning and recognizing human activities of daily living. The present disclosure is in no way limited to these techniques; rather, any suitable approach to activity modeling may be used.

The model 138 may also include a model of statistical certainties or uncertainties relating to the various real-time inputs 116, the stored information 118, or the current situation and/or context determined by the inference engine 110. For instance, the model 138 may include data indicating a degree of certainty or confidence level that a certain real-time input 116 or piece of stored information 118 has been accurately identified or classified, or that the current situation and/or context has been accurately determined by the inference engine 110. In general, aspects of the model 138 can be associated with the various templates 132, rules 134, and/or patterns 136, real-time inputs 116, and/or stored information 118.

In some embodiments, a semantic model 140 associates semantic information with real-time inputs 116, stored information 118, templates 132, rules 134, and/or patterns 136. The semantic information may include the high-level characterizations of inputs, information and activities mentioned above, as well as associations between or among aspects of the user's current situation and context that enable the inference engine 110 to better understand, at a high level, the mobile user's activity at a given point in time. For example, semantic information extracted from unstructured data or derived from digital media (e.g., real-time inputs 116 and/or stored information 118) may be stored in the semantic model 140.

In some embodiments, a contextual model 142 includes information relating to the user's interactions with the virtual world; e.g., interactions with the mobile device relating to electronic content, communications, or software applications. Such information may be collected using a variety of techniques, including instrumented software applications, gaze analysis, and/or screen scraping techniques, to name a few. Information contained in the contextual model 142 may be used by the inference engine 110 in determining the user's current situation and context.

For example, if the real-time inputs 116 suggest that the user has stopped in front of a shopping center, but the most recent software application accessed by the user on the mobile device was a map application in which driving directions to another location were requested, the inference engine 110 may infer that the shopping center is not the user's final destination and therefore refrain from suggesting any coupons or special offers that may be available at the shopping center.

In some embodiments, the knowledge base 130 includes a security and privacy policies knowledge store 144, which contains rules, arguments, parameters and/or data relating to security and/or privacy policies associated with the use of the system 100. A mobile device configured with the system 100 typically contains a set of default security and/or privacy policies, which can be modified and/or supplemented by the user, or by the system 100 over time (e.g., through machine learning). In various embodiments, privacy and/or security policies are associated with one or more of the real-time inputs 116, one or more of the stored information 118, with the mobile device, with certain types or categories of data, templates 132, rules 134, patterns 136, inferences, candidate actions, or methods of performing candidate actions. For instance, the user may specify that only certain types of data or data sources be used by the inference engine 110 to determine the user's current situation and/or context or to generate or present candidate actions, or that such data or sources may only be used in certain situations or contexts. As another example, the user may wish to disable the context learning feature of the system 100 or only permit the system 100 to engage in learning based on explicit inputs from the user. As a further example, the user may wish to specify that the system 100 can monitor real-time inputs that indicate the user's current location, but not real-time inputs that indicate the user's degree of motion or position.

Similarly, other user-specific policies and preferences 146 may be included in the knowledge base 130. The user-specific policies and preferences 146 may include rules, arguments, parameters and/or data relating to policies or preferences of a specific user or users of the mobile device, and may be defined or configured by the user or learned over time using the automated learning techniques discussed herein. Some examples of user-specific policies and preferences 146 include those relating to the user's preferred style of receiving candidate actions and whether candidate actions can be executed autonomously by the system 100 (e.g., without requiring advance approval from the user).

Context Learning

In some embodiments, the monitoring module 112 includes a context learning sub-module ("learning module") 114. The learning module 114 observes, in an automated fashion, the real-time inputs 116, the stored user-specific information 118, the operation of the inference engine 110 in applying the knowledge base 130 to generate current context inferences over time, and the user's explicit and/or implicit responses to system-generated candidate actions. The learning module 114 applies artificial intelligence-based machine learning algorithms to continuously improve the knowledge base 130, adapt the knowledge base 130 to the mobile user's personal schedule, routine, or rhythm of activity, and to allow the system 100 to improve its ability to offer personalized, timely and helpful candidate actions to the user at appropriate times and using appropriate presentation methods.

For example, the learning module 114 may notice over a period of time that a particular combination of real-time inputs 116 and stored information 118 relates to an activity that the user performs at the same time each day (e.g., a daily commute where the user takes the same route each day). As a result, the learning module 114 can build an increasingly accurate and statistically predictive model of the user's daily activity (e.g., the expected timing and route of the user's commute), and may classify certain activities or groups of activities as routines or often-repeated activities.

As another example, the learning module 114 may notice that a particular combination of real-time inputs 116 and stored information 118 appears to relate to an activity that the mobile user has not conducted previously. For example, a real-time input may indicate a change in the daily commute due to a traffic accident or an unexpected medical appointment, or stored information (e.g. calendar entries or email messages) may indicate a change in schedule. In these and other instances, the learning module may classify the activity as an anomaly or exception to the user's normal routine (e.g., a not-often-repeated activity), thereby further improving the knowledge base 130.

As a further example, the learning module 114 may compare the current set of real-time inputs 116 to stored information 118 for many instances of an activity over time and thereby observe whether the user tends to conduct activity according to strict rules or more flexible standards. For instance, the learning module 114 may compare the time that a user actually arrives at a scheduled meeting with the meeting start time as gleaned from the stored information 118, and after observing many such comparisons over time, make an observation as to whether the user tends to be very punctual or more casual about particular commitments or types of commitments.

In some embodiments, the learning module 114 records and analyzes streams of real-time inputs 116 alone or in combination with stored information 118 using one or more automated learning techniques, such as any one or more of those described in the aforementioned U.S. Patent Application Publication No. 2009/0307162 to Bui et al. Bui et al. describes some examples of computerized algorithmic learning processes, such as inference methods, mixed initiative or active learning, synchronous and asynchronous question and answer techniques, and learning by using knowledge base queries. These and/or other techniques may be used by the learning module 114. However, the present disclosure is in no way limited to the foregoing techniques; rather, any similarly suitable automated learning methods may be used.

Inter-Application and Inter-Device Operation

Referring now to FIG. 2, an illustrative embodiment 200 of the system 100 includes a computing system 210, which may include a mobile electronic device alone or in combination with other devices and systems. As should be appreciated by those skilled in the art, the computing system 210 includes one or more sensors 218, computer hardware 220 (e.g., processor(s), controllers, digital signal processors, memory, I/O systems, etc.) and peripheral devices 222 (e.g., network interfaces, cameras, scanners, etc.). At runtime, the user interface and applications software 212 interfaces with the mobile user directly (using, e.g., various I/O mechanisms) and interfaces with the sensors 218, computer hardware 220, and peripheral devices 222 via the framework/middleware 214 and the systems software 216.

The systems software 216 may include one or more operating systems, device drivers, inter-process communication (IPC) mechanisms, and the like. The framework/middleware 214 may include application programming interfaces or APIs, object libraries, and the like. The user interface and applications software 212 may include a variety of different kinds and types of software applications (such as any of those described above) or user-level (e.g., "client") portions thereof.

In the embodiment 200, the inference engine 110 and the action generator module 122 are embodied as framework/middleware 214, while the execution/presentation module 124 is embodied as part of the applications software 212. As a result, the inference engine 110 can monitor and process real-time inputs 116 and/or stored information 118 from various sources and/or types of sources (such as data from different software applications, hardware, and/or peripheral devices). Further, the action generator module 122 can generate candidate actions that involve a variety of different software applications, data sources, and/or devices. Such candidate actions may be presented to the mobile user in a number of different ways that may be internal or external to one or more of the software applications 212. For instance, in some embodiments, a suggestion may be presented to the user within the execution environment of a particular software application, while in other embodiments, candidate actions may be presented at the device or operating system level, e.g., independently of other software applications that may be available on the mobile device.

Further, in the embodiment 200, the mobile device may engage in one- or two-way communication with any one or more of the various sources of real-time inputs 116 and/or stored information 118 shown in FIG. 1, to send and/or receive information from such other devices and/or systems. Some examples of bidirectional communication between the system 100, 200 and other devices or systems involve the system 100, 200 interfacing with embedded systems, such as in-vehicle systems. For instance, the system 100, 200 may determine, based on real-time inputs 116 from a vehicle in which the user is located, that the vehicle is low on gas. The system 100, 200 may also know from the user's calendar entries or other stored information 118 that the user is about to embark on a long trip. The inference engine 110 can apply inference algorithms and logic to determine that it is highly likely that the gas tank needs to be filled up right now.

The action generator module 122 may then generate an alert that tells the user that the vehicle needs gas, and may interface with the vehicle's navigation system to execute a search algorithm using GPS data to locate the nearest gas station. The execution/presentation module 124 may then communicate with the vehicle's navigation system so that the vehicle navigation system displays a map or driving directions to the gas station. On the other hand, if the user does not have any trips planned in the near future (as determined by the inference engine 110 based on stored information 118), the inference engine 110 may infer that the need to find a gas station is not urgent. In that case, the action generator module 122 may simply generate a notification indicating the number of miles or kilometers until the gas tank is empty.

Inferring Current Context

The illustrative inference engine 110 is configured as an intelligent software agent that can, with the user's permission, continuously assess the user's current situation and context based on the real-time inputs 116 and the stored information 118, and initiate the generation and presentation or execution of candidate actions where and when appropriate. As with the inputs and information monitoring described above, the operation of the inference engine 110 can be turned on and off or be scheduled to run only at certain times, by the user or automatically in accordance with the policies 144, 146.

Figure 3:
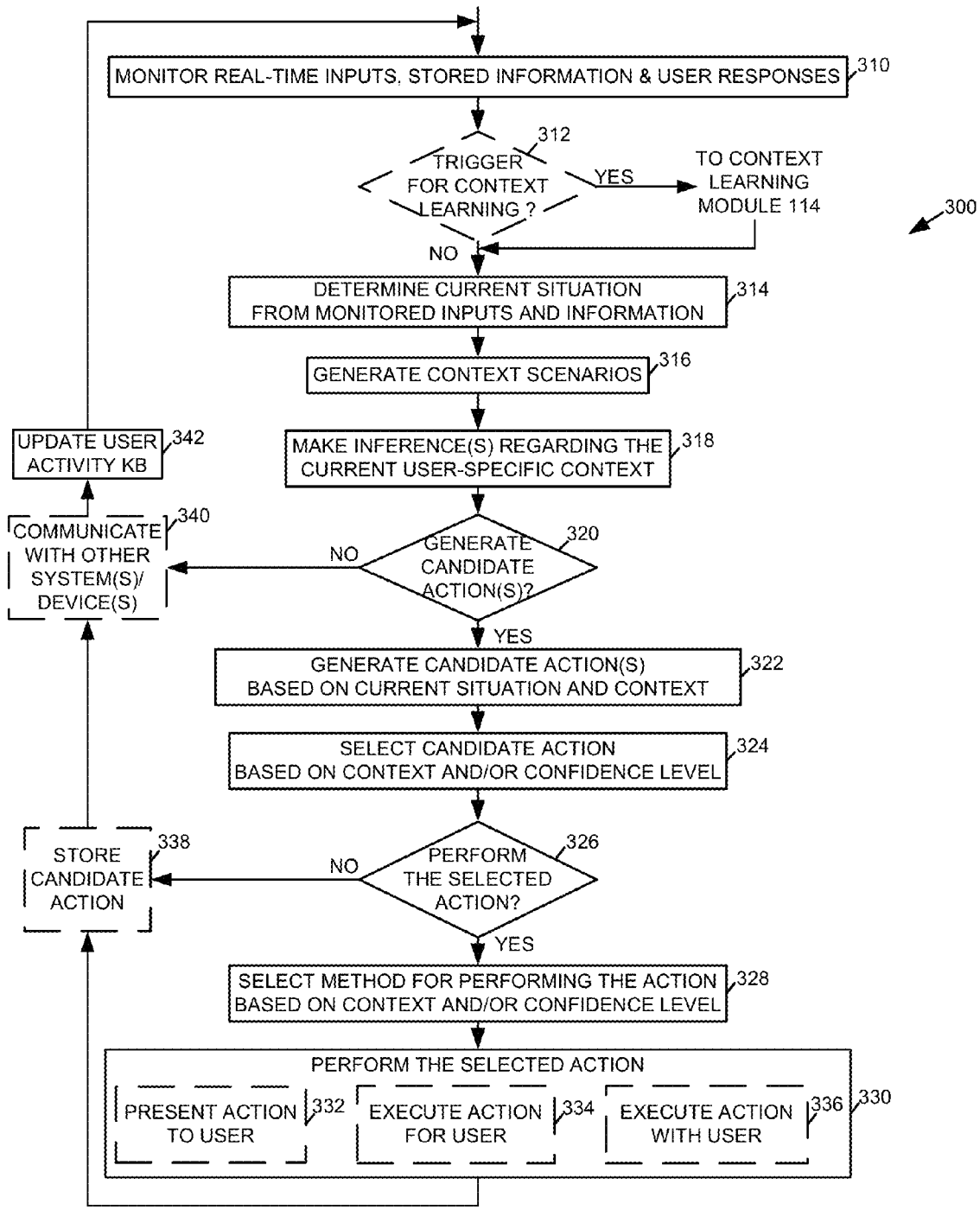
FIG. 3 is a simplified flow diagram for at least one embodiment of a method for automatically inferring a mobile user's current context.

Referring now to FIG. 3, an illustrative method 300 executable as computerized programs, routines, logic and/or instructions by the inference engine 110 and/or one or more of the other modules 112, 114, 120, 122, 124 of the system 100, 200, to monitor real-time inputs 116 and stored information 118, make inferences, generate and perform candidate actions relating to the user's current situation and context at the mobile device, is shown. At block 310, the method 300 monitors the real-time inputs 116, stored information 118, and user feedback as described above. At block 312, the method 300 analyzes any one or more aspects of the knowledge base 130 to determine whether the user's current activity may be of interest for learning purposes and invokes the context learning module 114, described above, and/or proceeds to block 314, as appropriate.

At block 314, subject to privacy considerations and/or other user-specific preferences (which may be configured by the user at the mobile device via, e.g., a graphical and/or natural language user interface and the policies 144, 146), the method 300 analyzes the real-time inputs 116 in view of the stored information 118 and the knowledge base 130 to determine one or more aspects of the mobile user's current situation or "mobile context," e.g., where they are located geographically, whether they are moving or stationary, whether they are seated, standing, or laying down, whether they are moving quickly or slowly, what people, places and/or things may be located nearby, etc. The method 300 can use stored information 118 as well as aspects of the knowledge base 130 to inform its assessment of the user's current situation. For example, real-time inputs 116 may indicate that the user has entered an office building at a particular geographic address, and the stored information 118 or knowledge base 130 may inform the method 300 that the office building is actually where the user works.

Having assessed the user's current situation from a location/movement/position perspective, the illustrative method 300 generate one or more possible context scenarios at block 316. As an example, if real-time inputs 116 indicate that the user has arrived at a shopping mall, one possible context scenario may be that the user is going shopping to buy a birthday present for a friend; another context scenario may be that the user is planning to meet a friend at a restaurant or movie theater; and another context scenario may be that the user is headed to a particular store in the mall to return an item previously purchased. The possible context scenarios are generated by comparing the user's current situation to one or more of the templates 132, rules 134, and activity patterns 136. As an example, a rule may exist that says "if the user is at a store or shopping mall, check the user's calendar or contacts for upcoming events, such as birthdays or anniversaries." The system 100 may then compare the user's current location and/or movement (as determined based on real-time inputs 116) to an activity pattern or template that specifies that the user normally goes to the store every Tuesday after work, and generate a context scenario based on the user's current location, the current date and time, and the activity pattern or template. For instance, if it is not Tuesday afternoon, a context scenario might be that the user is simply driving past the store on the way to another appointment. However, if it is Tuesday afternoon, a context scenario may be that the user is going to the store according to his or her normal routine. As a result, the method 300 may automatically suggest items to buy at the store as gifts for the upcoming birthdays or anniversaries, or may not generate any suggestion, based on the most probable context scenario as discussed below.

At block 318, the method 300 performs automated reasoning using any one or more of the machine-executable algorithms, rules, templates, patterns, and/or models described above, to make inferences about the specific context of the mobile user in the current situation. That is, the method 300 makes determinations as to what the user may be doing and/or why they might be in the current situation, using automated artificial intelligence-based inference algorithms and/or other similarly suitable techniques, at block 318. Once the user-specific context of the current situation is better understood, the method 300 identifies or selects one or more of the possible context scenarios generated at block 316 that appear to be more likely relevant to the current situation. For instance, the method 300 may utilize probabilities or statistical likelihoods associated with various activities to infer, based on one or more aspects of the user's current situation, what the user's current purpose or objective may be. In the shopping mall example, for instance, the method 300 may reason that it is more likely that the user's objective at the shopping mall is to purchase a birthday present, based on calendar information, recently sent or received messages (e.g., a social-media wall post of "Happy Birthday!"), or a recently received invitation generated by a web-based or otherwise automated invitation service (e.g., EVITE). It should be understood by those skilled in the art that, in at least some embodiments, the order in which blocks 314, 316, and 318 occur is not important. That is, in some embodiments, the method may perform one or more of the activities of blocks 314, 316 and 318 at the same time or in the reverse order to that described above.

Generating and Performing Actions

At block 320, the method 300 analyzes any confidence levels that may be associated with its determination of the user's current situation or current context. The method 300 considers those confidence levels in determining whether to generate any candidate actions. For example, if the confidence level associated with one of the real-time inputs on which the determination of the current situation is based is not very high, the method 300 may conclude that it has insufficient information and proceed to block 340 or block 342. To increase the confidence level, the method 300 may activate additional sources of real-time inputs 116 (such as turning on a camera, microphone, or GPS sensor), query other nearby devices or services, or take other action to seek confirmation that it has made an accurate (e.g., within system- or user-supplied tolerances) assessment of the current situation and context. For instance, the method 300 may analyze WI-FI, BLUETOOTH, or other short-range wireless transmissions to determine the user's location, position, or degree of movement with finer granularity. This may be accomplished by extracting the information identifying nearby wireless access points (which can include the name of the hosting establishment in plain text), from the wireless transmissions received at the mobile device. So, as an example, if the mobile device's GPS sensor indicates that the user is at a shopping mall, the method 300 may activate additional sensors to look for wireless signals, images, or sounds to confirm the user's location or to pinpoint the user's location within the shopping mall at a greater level of detail or with more accuracy than can be provided by GPS alone.

If the method 300 concludes at block 320 that its assessment of the user's current situation and context is adequate to support the generation of candidate actions, the method 300 proceeds to block 322. Based on the one or more selected context scenarios, at block 322, the method 300 executes computerized logic (using, e.g., rules 134 and/or other aspects of the knowledge base 130) to generate one or more candidate actions at the mobile device.

As noted above, candidate actions may include a variety of different system-generated responses to the current situation and context. As an example, a candidate action may include a notification that the system 100, 200 has already sent a message to other meeting attendees informing them that the user will be late due to traffic. Another candidate action may include automatically sending a notification, instruction, or information to an embedded system or other source of real-time inputs 116 with or without the user's advance approval (e.g., an instruction to a home appliance or entertainment system to turn on or off based on the user's current situation and context or a notification to an in-vehicle system). Yet another candidate action may be a suggestion that is presented to the user at the mobile device (e.g., a suggestion that the user make a phone call right now).

Candidate actions may be gleaned from the knowledge base 130 and/or the context scenarios generated at block 316 and/or the application of one or more rules 134 to the current situation and context. Candidate actions are formulated to be appropriate given the mobile user's current situation and context. That is, candidate actions may change as the user's current situation and context changes, and different candidate actions may be generated when the user is in the same or a similar situation (e.g. location/movement/position) but in different contexts (e.g., purpose/objective) or vice versa.

Confidence levels may be associated with candidate actions. Such confidence levels can be based on one or more of the policies 144, 146 as well as learning mechanisms that respond to feedback provided by the user over time as described above. The method 300 may have a greater or lesser degree of confidence in the current desirability of a candidate action based on the user's prior responses to similar candidate actions or based on one or more of the policies 144, 146. For instance, if the user is running late for a meeting, one possible candidate action is to send a text message to all other meeting attendees informing them that the user may be late, while another candidate action may be to simply cancel the meeting. If the user has canceled meetings under similar circumstances in the past, the candidate action of canceling the meeting may have a higher confidence level than the candidate action of sending a message.

At block 324, the method 300 reviews the candidate action(s) generated at block 322 and considers the likelihood that each candidate action may be appropriate for the current situation and context and/or preferred by the user. In this regard, the method may consider the above-mentioned confidence levels alternatively or in addition to the various aspects of the current situation and context. In view of these factors, the method 300 selects a candidate action for delivery to the user in some form.

At block 326, the method 300 determines whether to perform the selected action at the mobile device or effectuate the action in some other way. This determination is made based on the current situation and context and/or confidence levels that may be associated with the various ways in which the selected action may be accomplished. Here again, confidence levels may be determined using learning mechanisms that respond to the user's feedback in response to previously performed actions, or may be gleaned from one or more of the policies 144, 146. For example, in some contexts the method 300 may conclude that the user does not wish to be bothered with a notification and defer the action to a later time. In such event, the method 300 may proceed to block 338 and store the selected action in computer memory (e.g., a log file or database) for later consideration by the user.

As another example, the method 300 may adjust the timing of a suggestion based on the user's current situation and context. For instance, the method 300 may determine that a real-time input 116 relating to a traffic situation has greater urgency because according to the user's calendar or a recent social media update, the user needs to drive to an appointment very soon. In this case, the method 300 may proceed to blocks 328, 330 and present a suggestion relating to the traffic situation (e.g., an alternate route) before, or with higher priority than, other suggestions that may be relevant to the user's current situation and context (and may store the other suggestions for a later time).

Alternatively or in addition, the method 300 may conclude that a selected action should be communicated to another computing system or electronic device (e.g., a notification that should be sent to a friend or family member). In that case, the method 300 may proceed to block 340, described below. If the method 300 determines that the selected action should be performed at the mobile device right now, the method 300 proceeds to block 328.

At block 328, the method 300 determines how to perform the selected action at the mobile device, in the present moment. To do so, the method 300 may refer to, e.g., the current situation and context, one or more of the policies 144, 146, and/or confidence levels associated with the various methods of performing the selected action at the mobile device as described above. For instance, if the user's current situation and context indicates that the user may be riding in a vehicle, the method 300 may present candidate actions in a highly visible and/or auditory manner, such as presenting the information on the car's display (e.g., a graphical or heads-up display). As another example, if the method 300 infers that the user is driving or riding in a vehicle, the method 300 may present map or driving directions, or newly received messages, in a more accessible manner (e.g., enlarged graphics, audio, etc.). If the user is positioned in front of an entertainment system, information, notifications, or candidate actions may be displayed on the TV or gaming device alternatively or in addition to the mobile device. In some embodiments, the presentation of a suggestion, whether in visual or audio format, may be followed by an interactive voice or textual "dialog" between the mobile device and the user (e.g., via a natural language interface).

Once the method of performing the action is determined, the method proceeds to block 330, where the action is performed using the selected mode or style. Illustrative examples of methods of performing the selected action at the mobile device shown in block 330 include presenting the action to the user (block 332), executing the action for the user (e.g., without user input or approval) (block 334), and executing the action with the user (e.g., interactively, with the user's involvement) (block 336).

Generally speaking, the execution or presentation of selected actions may take any suitable form of which the system 100, 200 is capable. For example, selected actions or information relating thereto may be executed or presented using visual (e.g., textual, graphical, two- or three-dimensional images, etc.), tactile changes, and/or audio output. In some embodiments, the execution or presentation of an action may involve requesting a response from the user. In these cases, the user's selection of or response to any action may be accomplished in any way of which the system 100, 200 is capable, including clicking, touching, pointing, gestures, motion, gaze, voice, subvocal, mouth noises (tongue clicks, etc.), brain electrodes, or any other suitable selection or activation methods (e.g., active/explicit or passive/implicit methods).

In determining how to respond to the current situation and context, a learned model can be used to enable the system's responses to evolve over time, based on feedback provided by the user through acceptance or rejection of previously performed or suggested actions. For example, based on the user's previous responses to suggestions and/or other actions, the method 300 may over time learn which types of responses are preferable to the user or that are appropriate in different circumstances. For example, the method 300 may initially do nothing in response to the current situation and context, then after further observing the user's activity over a period of time, present a suggestion that requires the user's approval to execute. Following additional observation of the user's responses to candidate actions and/or other inputs over time (such as confidence levels associated with various possible responses), the method 300 may determine that it is appropriate and acceptable to act autonomously on a particular suggestion and do so. For instance, if the method 300 generates a suggestion that involves making a purchase of an expensive item, the policies 146 may requires a higher confidence level in order to allow the mobile device to execute the suggestion autonomously than if the suggestion involves the purchase of a lesser-expensive item or some other relatively innocuous activity. An example of one mechanism that can be used to assess the appropriateness of various system-generated responses is a cost/benefit analysis augmented with a default set of rules that are combined with one or more of the user-specific preferences and/or policies 146. Some examples of such a mechanism are described in Yorke-Smith, N.; Saadati, S.; Myers, K.; and Morley, D. The Design of a Proactive Personal Agent for Task Management. International Journal on Artificial Intelligence Tools, 21(1), February 2012, which is incorporated herein by this reference. This disclosure is not limited thereby; rather, other suitable learning mechanisms may also be used as described above.

Referring to block 340, in some embodiments (and if so configured by the user), the method 300 may communicate actions over a network or using, e.g., cellular, WI-FI, VPN or NFC technology, to one or more other systems or mobile devices, at block 326. For instance, information and/or actions relating to the user's current situation and context may be shared with other user-designated persons (such as family, friends, or co-workers), so that schedules and information can be synchronized. As another example, if the user has multiple devices (such as a smartphone and a tablet computer, smart TV, or e-reader), the method 300 can pair (using, e.g., BLUETOOTH pairing, WI-FI, etc.) the devices so that actions generated at one of the mobile devices can be displayed on another device (e.g., on a larger display screen). Further, the method 300 may communicate information, actions and/or notifications to one or more embedded systems, software applications, peripheral devices, networked computing devices (e.g., servers, desktop computers, etc.) and/or other systems, devices, sources of real-time inputs 116 or sources of stored information 118.

At block 342, the method 300 updates the knowledge base 130 in accordance with user's responses to the various candidate actions. In some embodiments, the user's responses to the candidate actions are analyzed by the system 100, 200 in order to adaptively modify one or more aspects of the knowledge base 130. For instance, in some embodiments, likelihood scores or probabilities associated with templates 132, rules 134, or patterns 136 may be updated based on a selection (or lack thereof) or other action performed by the user in response to a suggestion. Alternatively or in addition, such feedback may be processed by the context learning module 114 (via block 310) as described above. Following block 328, the illustrative method 300 may return to block 310, where monitoring may continue based on the most recently determined current situation and context.

User Interface Examples

Figure 4:
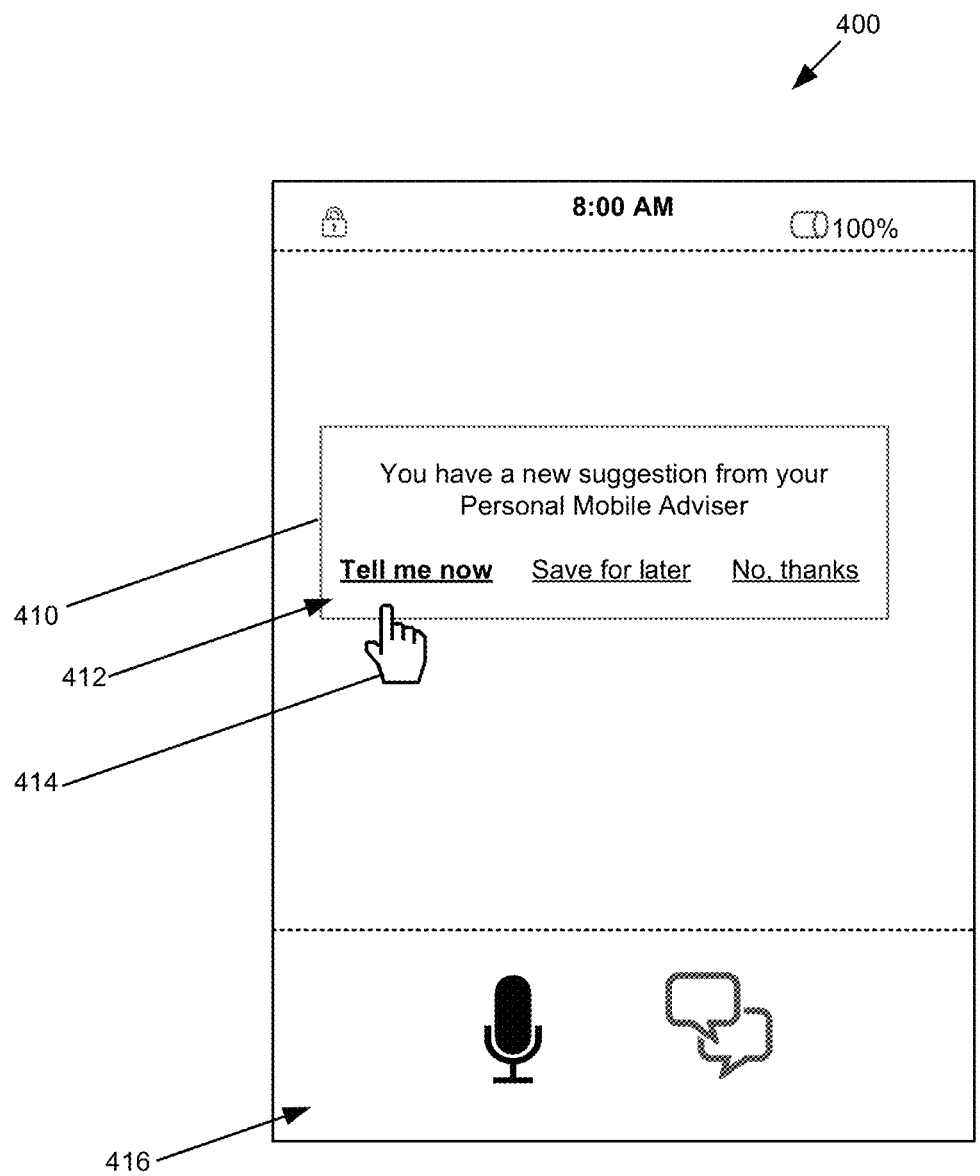
FIG. 4 is a simplified elevational view of an exemplary user interface that may be presented at an electronic device in connection with at least one embodiment of the system of FIG. 1.

Referring now to FIG. 4, an exemplary user interface display 400 is shown. The illustrative display 400 is at least a portion of a display screen of a mobile device and includes a touch-sensitive display or touch screen and microphone. A message or notification 410, generated in accordance with the foregoing description, is presented on the display 400. The message 410 may be displayed prior to the presentation of a candidate action by the system 100 in some embodiments; for instance, if for privacy or other reasons the user does not want the system-generated candidate actions to be automatically displayed. The message 410 has a non-interactive portion in which the content of the message or notification is presented (e.g. text and/or graphics), and an interactive portion 412, which enables the user to take some action in response to the message 410.

In the illustrative embodiment, the interactive portion 412 includes one or more options that can be selected by the user to initiate the presentation of a particular suggestion that has been generated by the system 100 based on the user's current situation and context, to delay presentation of the suggestion to a later time (e.g., to store the suggestion in a list or log that the user can access later at the mobile device), or to explicitly decline the suggestion. The illustrative display 400 also includes an applications portion 416, which contains icons that can be selected (using e.g., any suitable selection mechanism such as touch or contact 414) by the user to obtain further information about the suggestion or engage in a dialog (using, e.g., natural language or instant text messaging) about the suggestion and/or an appropriate response.

Referring now to FIG. 5, another exemplary user interface display 500 is shown. The illustrative display 500 is at least a portion of a display screen of a mobile device and includes a touch-sensitive display or touch screen and microphone. A suggestion 510, generated in accordance with the foregoing description, is presented on the display 500. All or portions of the suggestion 510 may be presented to the user in lieu of or subsequent to the message 410, in various embodiments of the system 100.

The illustrative suggestion 510 includes a message portion 512, which informs the user of situation and context-pertinent information, and an interactive portion 514, which enables the user to take action in response to the content displayed in the message portion 512. In the illustrative embodiment, both the message portion 512 and the interactive portion 514 are generated in accordance with the mobile user's current situation and context as described above, and include one or more details about the user's current situation and/or context. For instance, the exemplary message portion 512 is based on a system-generated inference that the user may find it helpful to make a phone call right now. The system-generated inference is based on one or more real-time inputs 116 indicating that the user's train is going to be late on this particular morning, combined with stored information 118 indicating that the user has a meeting with John scheduled for 9:00 a.m.

The interactive portion 514 of the suggestion 510 incorporates stored information about John (e.g., phone number), so that upon selection (using e.g., any suitable selection mechanism such as touch or contact 518) by the user, the phone call is automatically initiated. If the user wishes to decline the suggestion, he or she may select (using e.g., any suitable selection mechanism such as touch or contact 518) the user control 516 and the suggestion will be removed from the display 500.

The display 500 also includes an applications portion 520. In the illustrative embodiment, the particular controls that are displayed in the applications portion 520 are determined and/or arranged based on the user's current situation and context. Given the suggestion 510, the applications portion 520 displays interactive icons that can be selected (using e.g., any suitable selection mechanism such as touch or contact 518) by the user to initiate an action at the mobile device; for example, another action that may be relevant and more preferable to the user than the action suggested by the interactive portion 514. In the illustrative example, the system 100, 200 displays interactive icons that can be selected to launch a microphone (e.g., a natural language interface), phone, contacts, calendar, or web browser software application, in the applications portion 520. Thus, the system 100, 200 may have reasoned that if the user does not want to call John in response to the suggestion 510, the user may likely want to call someone else, look up contact information for his or her assistant or another colleague, check his or her calendar to see if the meeting may be rescheduled, or use the web browser to find out when the next train is scheduled, or if another train may be available. Such probable next actions may be determined, and corresponding interactive icons generated, by the inference engine 110 interfacing with the knowledge base 130 using standard programming techniques, and/or using technology described in Senanayake et al., U.S. patent application Ser. No. 13/534,155, filed Jun. 27, 2012.

Alternatively or in addition, the user may activate the microphone and tell the system to "tell John I will be late" or "tell John to reschedule the meeting." The system 100, 200 may then automatically determine which instruction is appropriate based on the user's current situation and context, and send an email, instant message, or automated phone message to John using the context of the situation.

Figure 6:
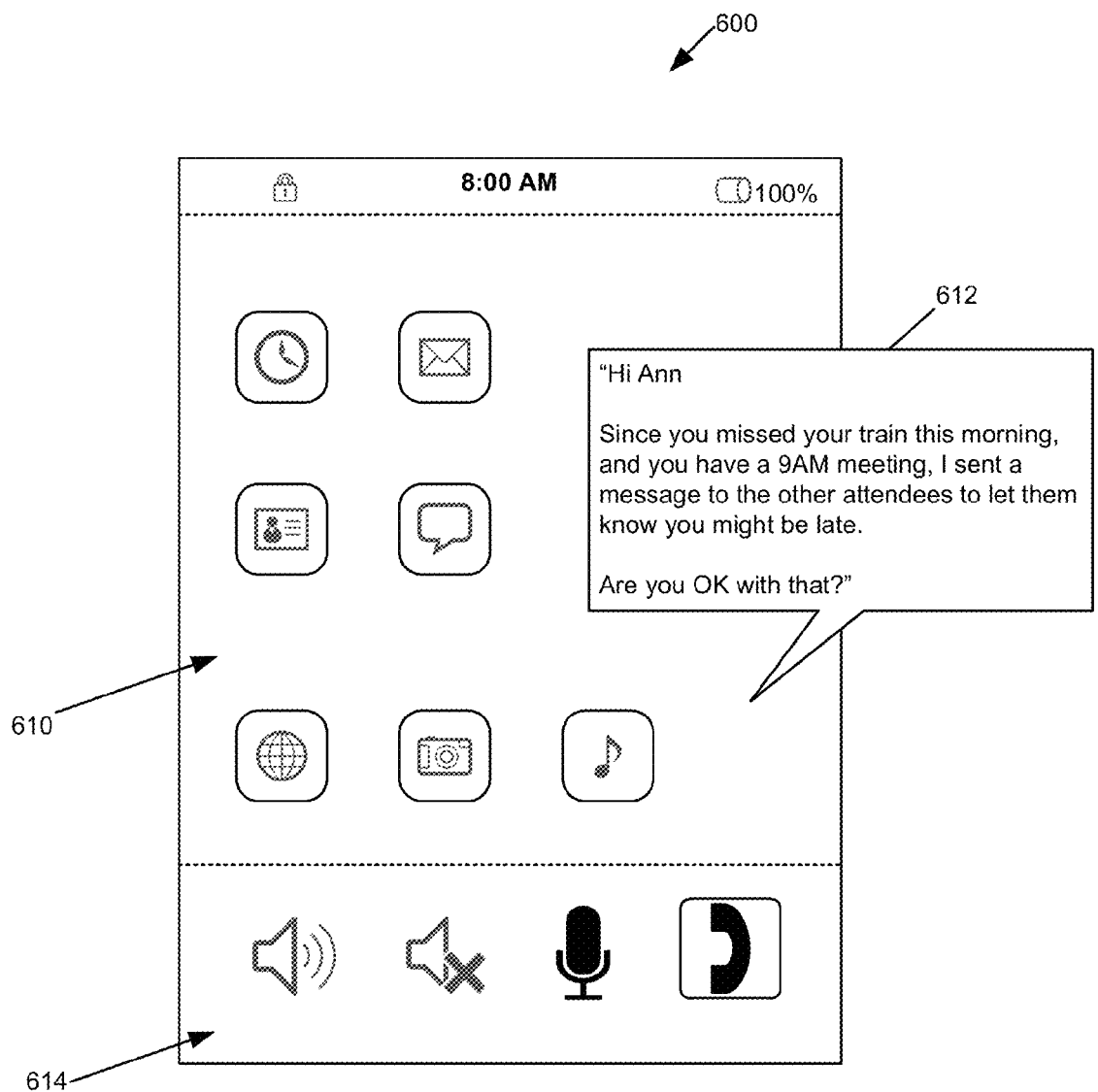
FIG. 6 is a simplified elevational view of another exemplary user interface that may be presented at an electronic device in connection with at least one embodiment of the system of FIG. 1.

Referring now to FIG. 6, another exemplary user interface display 600 is shown. The illustrative display 600 similar to the displays 400 and 500, described above. The display 600 includes a number of interactive software application icons 610 and user controls 614. In FIG. 6, the system 100, 200 responds to the current situation and context by executing a system-generated action without the user's involvement (e.g., sent a message to other meeting attendees) and presenting a notification 612 of same to the user, via a human voice natural language interface. The notification 612 informs the user of the action that the system has taken in response to the current situation and context and asks the user to provide feedback on the action taken. The user controls 614 are context-appropriate. That is, given that the notification 612 is presented audibly, the system displays controls that allow the user to adjust the sound volume, to engage in an interactive voice "dialog" with the system (using the microphone), or make a phone call.

Implementation Examples

Figure 7:
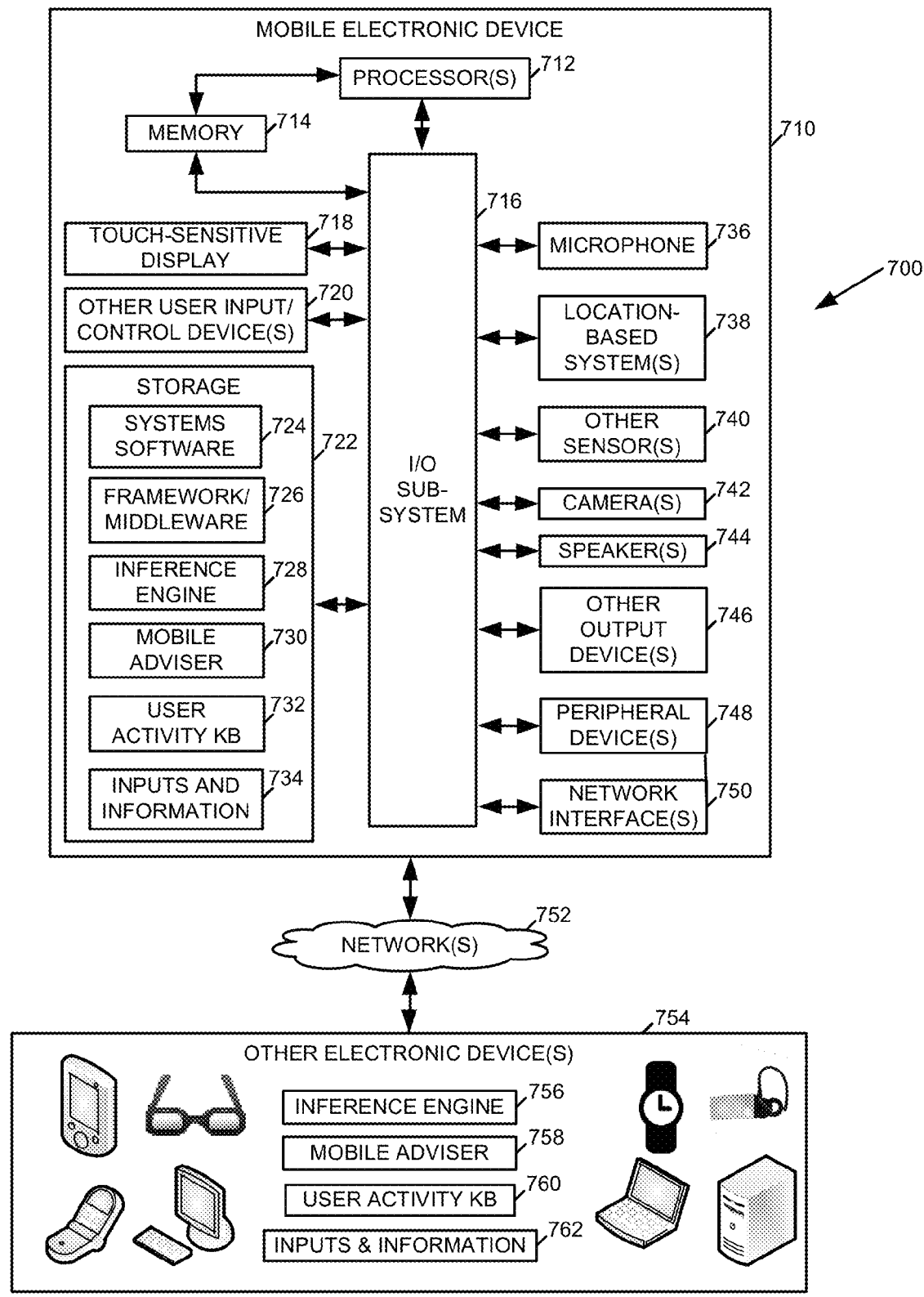
FIG. 7 is a simplified block diagram of an exemplary electronic device in connection with which at least one embodiment of the system of FIG. 1 may be implemented.

Referring now to FIG. 7, an illustrative system 700 including a mobile electronic device 710 in connection with which the system 100, 200 may be implemented, alone or in combination with one or more other electronic devices 754, is shown. In various embodiments of the system 700, all or portions of the inference engine 728 (which includes features of the inference engine 110), the mobile adviser 730 (which includes features of the mobile adviser 120), the user activity knowledge base 732 (which includes features of the knowledge base 130), and inputs and information 734 (which correspond to inputs and information 116, 118) are embodied in the mobile electronic device 710. Portions of the system 700 may be embodied as a stand-alone software application or may be incorporated into or accessed by one or more other software applications. For example, portions of the system 700 may be incorporated into other systems or interactive software applications. Such applications or systems may include, for example: operating systems, middleware or framework software, and/or applications software. Further, the system 700 may be local to a particular electronic device 710, or portions of the system 700 may be distributed across multiple computing devices 710, 750.

The illustrative computing device 710 includes at least one processor 712 (e.g. microprocessor, microcontroller, digital signal processor, etc.), memory 714, and an input/output (I/O) subsystem 716. In the illustrative embodiment, the computing device 710 is embodied as a personal electronic device such as a mobile, portable, wearable or handheld computing device, smartphone, personal digital assistant, laptop computer, tablet computer, desktop computer, head-mounted device (e.g., goggles, glasses, earpiece, headset, etc.), implant, electronic contact, or other body-mounted device. In other embodiments, the device 710 or portions thereof may be embodied as any type of computing device such as a server, an enterprise computer system, a network of computers, a combination of computers and other electronic devices, or other electronic device.

Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to at least one touch-sensitive display 718 (e.g., a touchscreen, virtual keypad, etc.), a microphone 736, one or more other input or user control devices 720 (e.g., a physical keyboard or keypad, buttons, hardpanel controls, tactile or haptic interface, etc.), at least one data storage 722, one or more location-based systems 738, one or more other sensors 740 (e.g., any of the aforementioned sensors) and/or other sources of real-time inputs (e.g., accelerometer, compass, GPS receiver, temperature sensor, etc.), one or more still and/or video cameras 742, one or more audio speakers 744, other output devices 746 (e.g., an LED, display screen, etc.), one or more other peripheral devices 748 (e.g., GPS transceiver, sound, graphics or media adaptors, etc.), and at least one network interface 750.

The network interface 750 communicatively couples the computing device 710 to one or more other electronic devices 754 via one or more networks 752. The network(s) 752 may include a local area network, wide area network, personal cloud, enterprise cloud, public cloud, and/or the Internet, for example. Accordingly, the network interface(s) 746 may include a wired or wireless Ethernet, mobile/cell network, WI-FI, BLUETOOTH, VPN, or NFC adapter or other suitable interface devices as may be needed, pursuant to the specifications and/or design of the particular networks 752.

The other electronic device(s) 754 may be embodied as any suitable type of computing device such as, for example, a server, an enterprise computer system, a network of computers, a combination of computers and other electronic devices, a mobile device, any of the aforementioned types of electronic devices, or other electronic devices.

The data storage 722 may include one or more hard drives or other suitable data storage devices (e.g., flash memory, memory cards, memory sticks, and/or others). In the illustrative embodiment, portions of systems software (e.g., an operating system, etc.) 724, framework/middleware (e.g., APIs, object libraries, etc.) 726, inference engine 728, mobile adviser 730, user activity knowledge base 732, and inputs and information 734 reside at least temporarily in the data storage 722. Portions of the systems software 724, the framework/middleware 726, the inference engine 728, the mobile adviser 730, the user activity knowledge base 732, and/or the inputs and information 734 may be copied to the memory 714 during operation, for faster processing or other reasons. Further, in some embodiments, portions of any of the systems software 724, the framework/middleware 726, the inference engine 728, the mobile adviser 730, the user activity knowledge base 732 and/or the inputs and information 734 may be specially configured for use in connection with a particular hardware platform or configuration, such as a particular implementation of a mobile computing device or a particular mobile computing device operating system.

In some embodiments, the inference engine 728, mobile adviser 730, user activity knowledge base 732 and inputs and information 734 may include a local portion (728, 730, 732, 734) (which may include a client application or front-end user interface and a back end or server application) and one or more remote or distributed portions 756, 758, 760, 762 (which may similarly include portions of the client application or front-end user interface and back end or server application). Regarding the user activity knowledge base 732, aspects may be local to the computing device 710, such as user-specific activity patterns, rules, or templates, while other aspects 760 may be located at one or more other electronic devices and accessible via one or more of the networks 752. Some aspects of the user activity knowledge base 732, 760 that may be stored at other devices include activity rules, patterns or templates that may have applicability to a broader population of users, and which the user has agreed may be shared with others.

The computing device 710 may include other components, sub-components, and devices not illustrated in FIG. 7 for clarity of the description. In general, the components of the computing device 710 are communicatively coupled as shown in FIG. 7, by one or more signal paths, which are represented schematically as bidirectional arrows. Such signal paths may be embodied as any type of wired or wireless signal paths capable of facilitating communication between the respective devices and components.

General Considerations

In the foregoing description, numerous specific details are set forth in order to provide a more thorough understanding of the present disclosure. It will be appreciated, however, that embodiments of the disclosure may be practiced without such specific details. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

The foregoing disclosure is to be considered as exemplary and not restrictive in character, and all changes and modifications that come within the spirit of the disclosure are desired to be protected. Further, while aspects of the present disclosure may be described in the context of particular forms of electronic devices and systems, it should be understood that the various aspects have other applications, for example, in other electronic devices or in any application in which it is desired to improve or enhance the human-electronic device experience.

The invention claimed is:

1. A method for presenting an automated suggestion at a mobile electronic device, the method comprising, with the mobile electronic device:

by one or more sensors coupled to the mobile electronic device, receiving one or more real-time inputs indicative of an implicit cue regarding a user-specific physical activity in relation to a surrounding physical environment;

by an automated inference engine coupled to the mobile electronic device, accessing the real-time inputs and one more items of previously stored user-specific information;

by the automated inference engine, based on a combination of the one or more real-time inputs and the stored user-specific information, generating a plurality of different user-specific contexts, each user-specific context corresponding to an inferred purpose for the user-specific physical activity;

by the automated inference engine, algorithmically selecting at least one of the plurality of different user-specific contexts;

generating an automated suggestion based on the selected user-specific context; and presenting the automated suggestion by an output device of the mobile electronic device.

2. The method of claim 1, comprising automatically generating the plurality of different user-specific contexts, wherein one or more of the different user-specific contexts relates to an often-repeated situation and one or more of the different user-specific contexts relates to a not-often-repeated situation.

3. The method of claim 2, comprising determining not to present an automated suggestion in response to the selected user-specific context corresponding to an often-repeated situation.

4. The method of claim 2, comprising presenting the automated suggestion in response to the selected user-specific context corresponding to an often-repeated situation.

5. The method of claim 2, comprising presenting the automated suggestion in response to the selected user-specific context corresponding to a not-often-repeated situation.

6. The method of claim 5, comprising selecting a method of presenting the selected automated suggestion based on the user-specific context corresponding to a not-often-repeated situation and presenting the automated suggestion according to the selected method.

7. The method of claim 2, comprising determining not to present an automated suggestion in response to the selected user-specific context corresponding to a not-often-repeated situation.

8. A computing device comprising at least one processor and computer circuitry coupled to the at least one processor, wherein the computer circuitry is arranged to cause the at least one processor to perform the method of claim 1.

9. At least one machine-accessible storage medium comprising a plurality of instructions that in response to being executed result in a computing device performing the method of claim 1.

10. A method for providing an automated suggestion in response to a current situation pertaining to a location, position, or movement of a person in relation to a physical environment, the method comprising, with a mobile electronic device:

by one or more sensors coupled to the mobile electronic device, receiving one or more real-time inputs indicative of an implicit cue regarding a user-specific physical activity in relation to a surrounding physical environment;

by an automated inference engine coupled to the mobile electronic device, accessing the real-time inputs and one more items of previously stored information;

by the automated inference engine, based on a combination of the one or more real-time inputs and the stored user-specific information, generating a plurality of user-specific contexts, each user-specific context corresponding to a different inferred purpose for the user-specific physical activity;

by the automated inference engine, algorithmically selecting a user-specific context of the plurality of different user-specific contexts;

generating an automated response based on the selected user-specific context; and by a processor of the mobile electronic device, executing the automated response.

11. The method of claim 10, wherein the execution of the automated response comprises executing an electronic transaction using software at the mobile electronic device.

12. The method of claim 10, wherein the execution of the automated response comprises sending a communication relating to the inferred user-specific context to another electronic device.

13. The method of claim 12, comprising determining, from the selected user-specific context, one or more recipients for the communication and sending the communication to the one or more recipients over an electronic network.

14. The method of claim 10, wherein the execution of the automated response comprises storing data relating to the selected user-specific context in a knowledge base.

15. The method of claim 10, wherein the execution of the automated response comprises receiving one or more other real-time inputs at the mobile electronic device and repeating the accessing, generating, selecting, generating, and executing.

16. The method of claim 15, wherein the execution of the automated response comprises activating a source of real-time inputs to receive the one or more other real-time inputs.

17. The method of claim 10, comprising determining a current level of confidence associated with the selected user-specific context and selecting a method of automatically responding based on the current level of confidence.

18. The method of claim 10, comprising generating a candidate action based on the selected user-specific context; determining a current level of confidence associated with the candidate action; and based on the current level of confidence, determining whether to present the candidate action, automatically execute the candidate action, defer the candidate action until a later time, or discard the candidate action.

19. A computing device comprising at least one processor and computer circuitry coupled to the at least one processor, wherein the computer circuitry is arranged to cause the at least one processor to perform the method of claim 10.

20. At least one machine-accessible storage medium comprising a plurality of instructions that in response to being executed result in a computing device performing the method of claim 10.

21. The method of claim 1, wherein generating the plurality of different user-specific contexts is further based on one more items of non-user-specific information.

* * * * *